United States Patent [19]

Hendrickson et al.

[11] Patent Number: 4,523,285

[45] Date of Patent: Jun. 11, 1985

[54] VENDOR CONTROLLER

[75] Inventors: William W. Hendrickson; Theodore B. Boerding, both of St. Charles, Mo.

[73] Assignee: UMC Industries, Inc., Stamford, Conn.

[21] Appl. No.: 313,813

[22] Filed: Oct. 22, 1981

[51] Int. Cl.[3] ........................ G06F 15/20; G07F 11/00

[52] U.S. Cl. ................................ 364/479; 340/825.35

[58] Field of Search ................... 340/825.35; 364/200, 364/900, 479

[56] References Cited

U.S. PATENT DOCUMENTS

| | | | |
|---|---|---|---|
| 3,199,727 | 8/1965 | Romanowski | 222/20 |
| 4,107,777 | 8/1978 | Pearson et al. | 364/465 |
| 4,218,738 | 8/1980 | Matyas | 364/200 |
| 4,231,105 | 10/1980 | Schuller et al. | 364/900 |
| 4,237,536 | 12/1980 | Enclous | 364/479 |
| 4,245,308 | 1/1981 | Hirchman et al. | 364/200 |
| 4,276,999 | 7/1981 | Reichenberger | 364/479 |
| 4,328,539 | 5/1982 | Heeger | 364/479 |
| 4,354,613 | 10/1983 | Desai et al. | 364/479 |
| 4,369,442 | 1/1983 | Werth et al. | 364/479 |
| 4,384,328 | 5/1983 | Watson | 364/200 |
| 4,412,292 | 10/1983 | Sedam et al. | 364/479 |

FOREIGN PATENT DOCUMENTS

| | | | |
|---|---|---|---|
| 2091449A | 7/1982 | United Kingdom | 364/479 |

*Primary Examiner*—Jerry Smith
*Assistant Examiner*—Michael R. Fleming
*Attorney, Agent, or Firm*—Senniger, Powers, Leavitt and Roedel

[57] ABSTRACT

A controller for a multi-item vendor includes a memory, a set of manually operable selectors, an alphanumeric display, and a logic circuit. Information associated with the vending of items is electronically stored in the memory by categories such as price, throw, sales and diagnostic tests and each category is subdivided into units such as price for each item or a particular diagnostic test. Each category of information has its own selector. The logic circuit causes the display to display an identifying multi-character alphanumeric designation of a unit of information for each actuation of the corresponding selector and a numeric value, if any, of that unit. All units of a given category may be displayed by a sufficient number of actuations of the appropriate selector. A data security key permits a supervisor to prevent others from gaining access to certain categories of information, the locked categories being selectable and changeable by the supervisor by using the key.

28 Claims, 35 Drawing Figures

VENDOR CONTROLLER

BACKGROUND OF THE INVENTION

This invention relates to control systems for vendors and more particularly to a controller for a vendor having a plurality of items to be vended.

A control system for vendors, described in U.S. Pat. No. 4,231,105, is available which allows the prices of items to be easily set and checked and which keeps track of the total accumulated sales of a vendor. Moreover, such a system can be used in beverage vendors (for example) to easily check and set throws of ingredients and water amounts. In the system of the aforesaid patent, parameters such as price are checked by putting the system in a price checking mode and pressing the selection switch of the item whose price is to be checked. This works very well in vendors with a large number of selections but it does require that the person checking the prices, or other parameter, have easy access to the selection switches and that he be careful to press the appropriate selection switch for the item he wants to check. With such a control system any authorized person (i.e., anyone with a key to the vending machine) such as a route man could retrieve any of the data, such as total accumulated sales, even though for security reasons it may be desired that only selected persons, such as a supervisor or the owner of the vendor, have access to such data.

SUMMARY OF THE INVENTION

Among the several objects of this invention may be noted the provision of a controller for a vendor having a plurality of items to be vended which permits easy checking and setting of prices and throws without the use of item selection switches; the provision of such a controller which eliminates the error involved in checking prices and throws which arises from pressing an incorrect selection switch; the provision of such a controller which limits access to sensitive data; and the provision of such a controller which is easy to use and relatively inexpensive.

Briefly, a controller of this invention includes a memory for electronically storing information associated with the vending of items, the information being divided into a number of categories such as price, throw and sales data. Each category is subdivided into units such as the price or ingredient throw for a particular item to be vended. The controller also includes a set of manually operable selectors, one selector for each category of information; an alphanumeric display; and logic circuitry. The logic circuitry is responsive to actuation of the selectors for retrieving from the memory one unit of vending information from the category corresponding to the actuated selector for each actuation of the selector and for signaling the alphanumeric display to display a multi-character alphanumeric designation identifying the particular information unit retrieved and a number representing the value of that information unit. All units of a given category are retrievable and displayable by repeated actuations of the corresponding selector.

In a second aspect of the invention, the controller also includes means for locking access to the categories of information. The locking means includes means for authenticating a data security key and means responsive to the presence of the data security key at the authenticating means for putting the controller in an access locking mode. The locking means in response to operation of one (i.e., any one) of the manually operable selectors while the controller is in the access locking mode locks access to the corresponding category of information if access thereto was previously unlocked. Access to a category of information which has been locked remains locked after the data security key is removed. Consequently, a person such as a supervisor may use a data security key to prevent others not possessing such a key from retrieving certain categories of information from the memory, which categories are selected by the supervisor.

In a third aspect of the invention, the controller includes a memory for storing information associated with the vending of items, a set of manually operable selectors, an alphanumeric display, and logic means responsive to actuation of any one of the selectors for signaling the alphanumeric display to display a multi-character alphanumeric designation associated with the actuated selector, at least some of said selectors having more than one multi-character designation associated therewith, the logic means being responsive to repeated actuations of the selectors to signal the alphanumeric display to display all the designations corresponding to the repeatedly actuated selector.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 2:
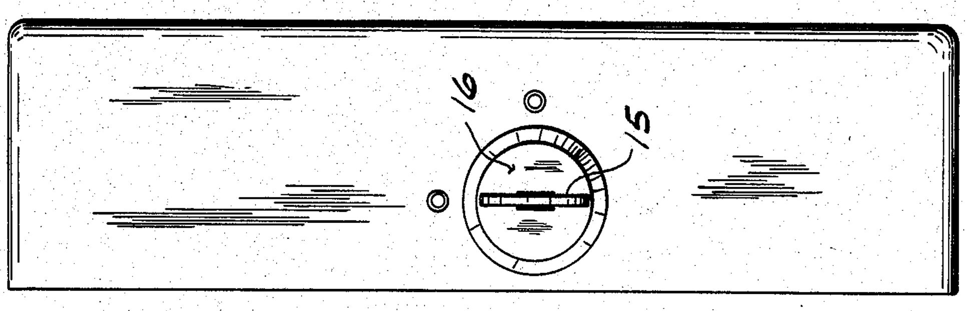
FIG. 2 is a right-side elevation of the controller.
Figure 1:
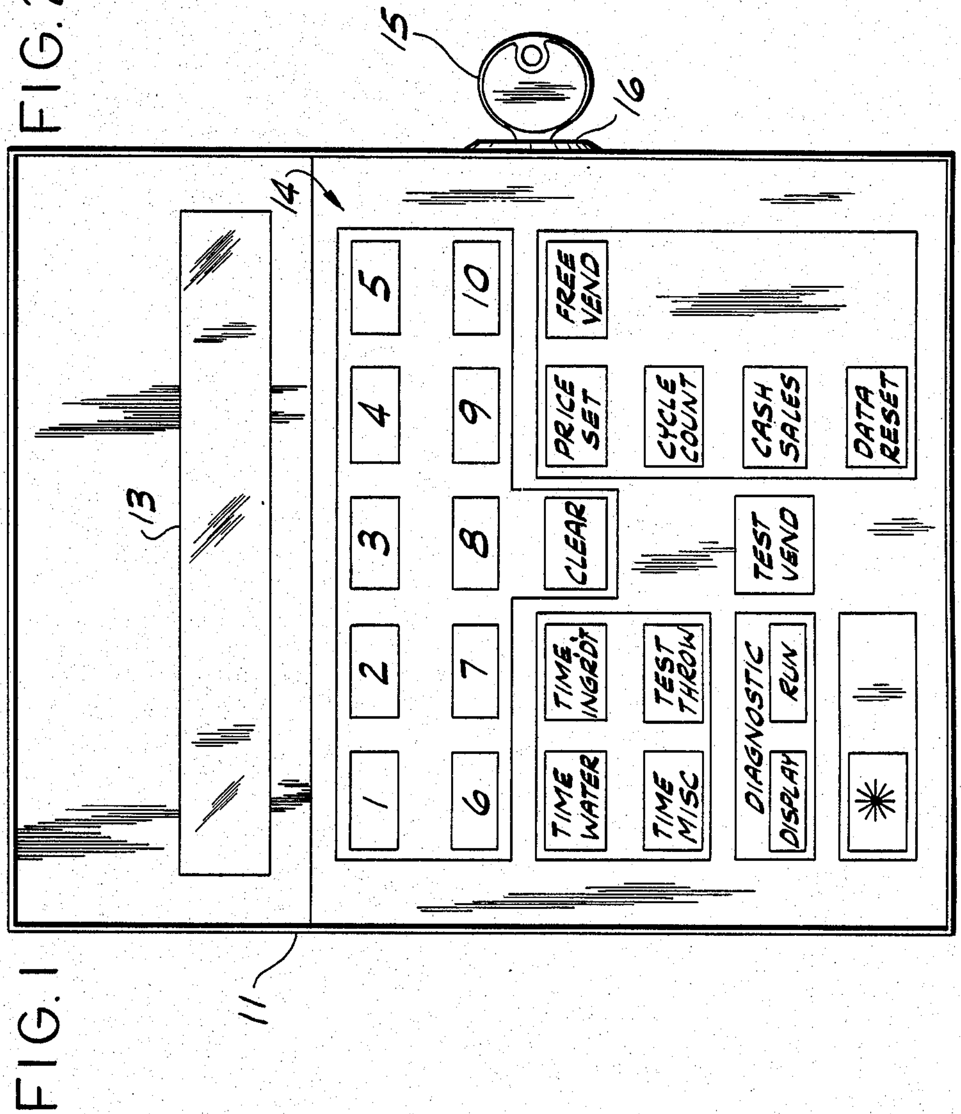
FIG. 1 is a front elevation of the controller of this invention.

Referring now to the drawings and more particularly to FIG. 1, a controller 11 for use with a vendor, such as a beverage vendor, having a plurality of items to be vended includes a sixteen character, alphanumeric display 13 and a keyboard 14 including a set of numeral switches labelled 1–9 and 0 for entering numbers into the controller, a switch labelled CLEAR for clearing entries, and a number of manually operable category selectors or switches labelled as follows: TIME WATER, TIME INGRD'T, TIME MISC, TEST THROW, DIAGNOSTIC DISPLAY, DIAGNOSTIC RUN, * (sometimes called STAR), PRICE SET, FREE VEND, CYCLE COUNT, TEST VEND, CASH SALES, and DATA RESET. A data security key 15 is shown inserted into an authenticating means, i.e., a lock 16, on the right side of controller 11.

Figure 3:
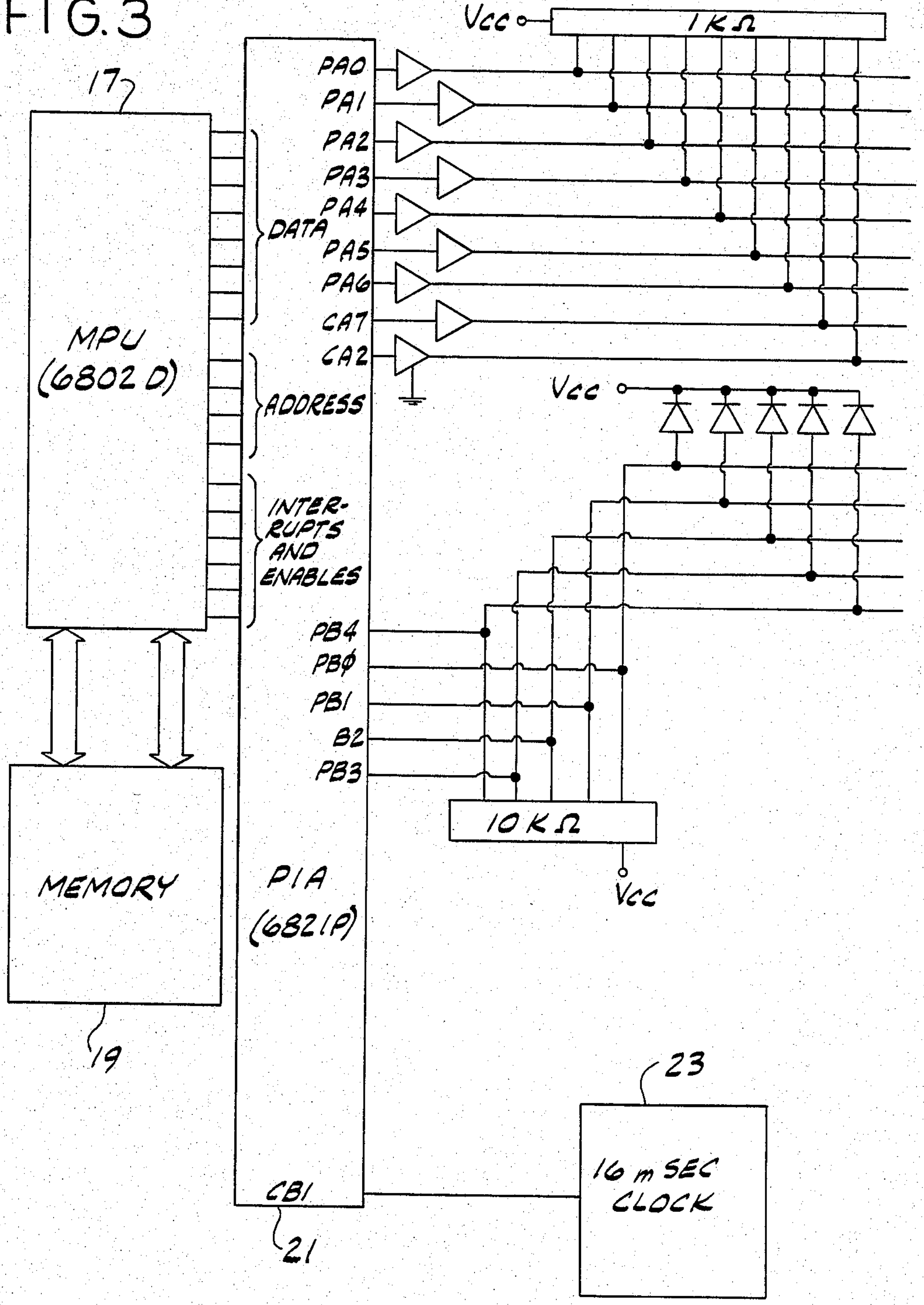
FIGS. 3 and 3A–3F are a schematic of electrical circuitry used in the controller of this invention.
Figure 3A:
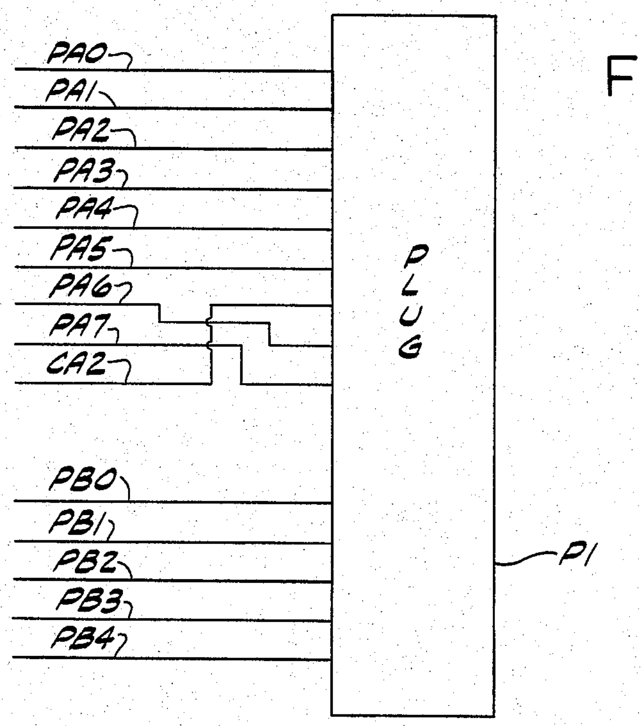
Figure 3B:
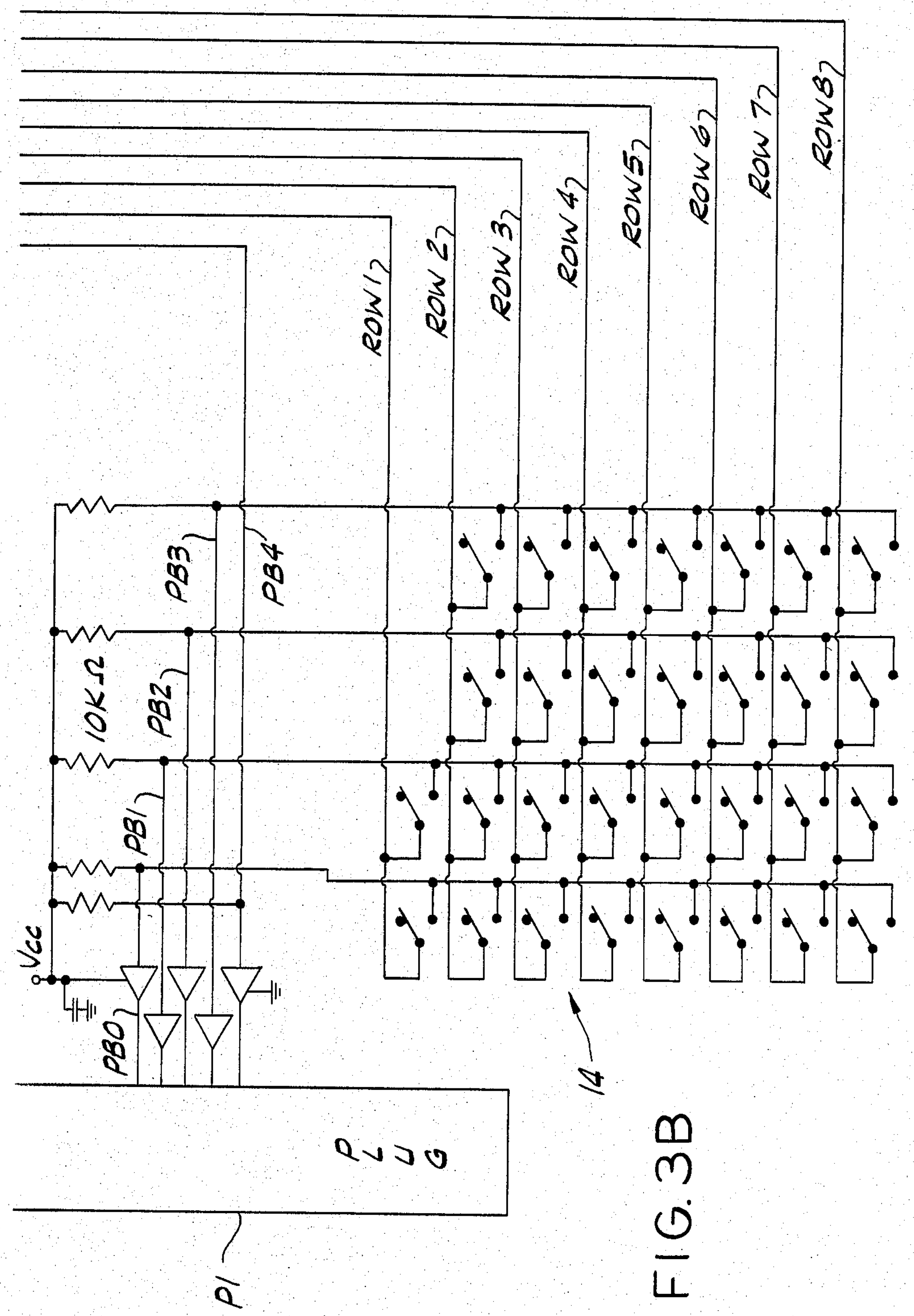
Figure 3C:
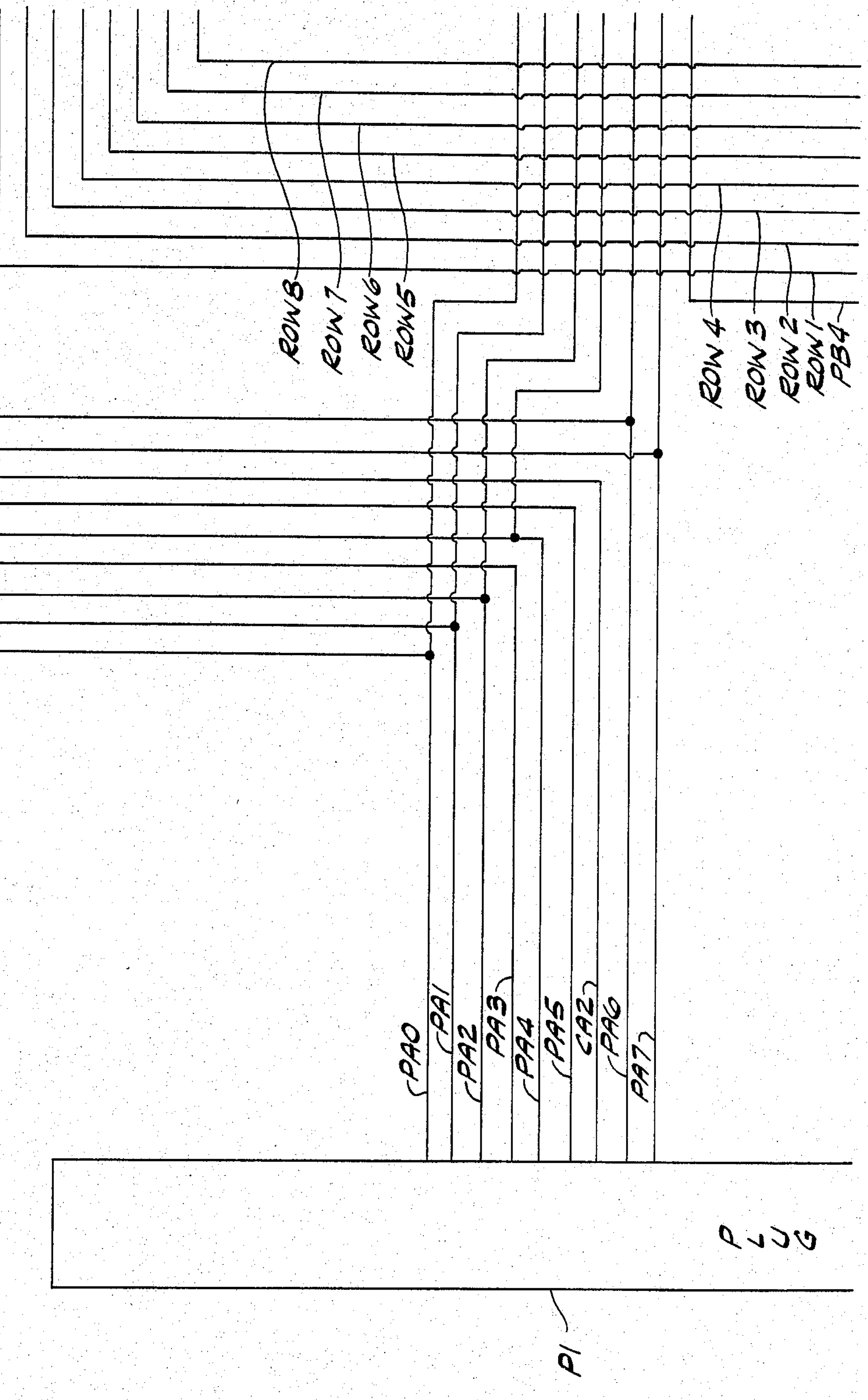
Figure 3D:
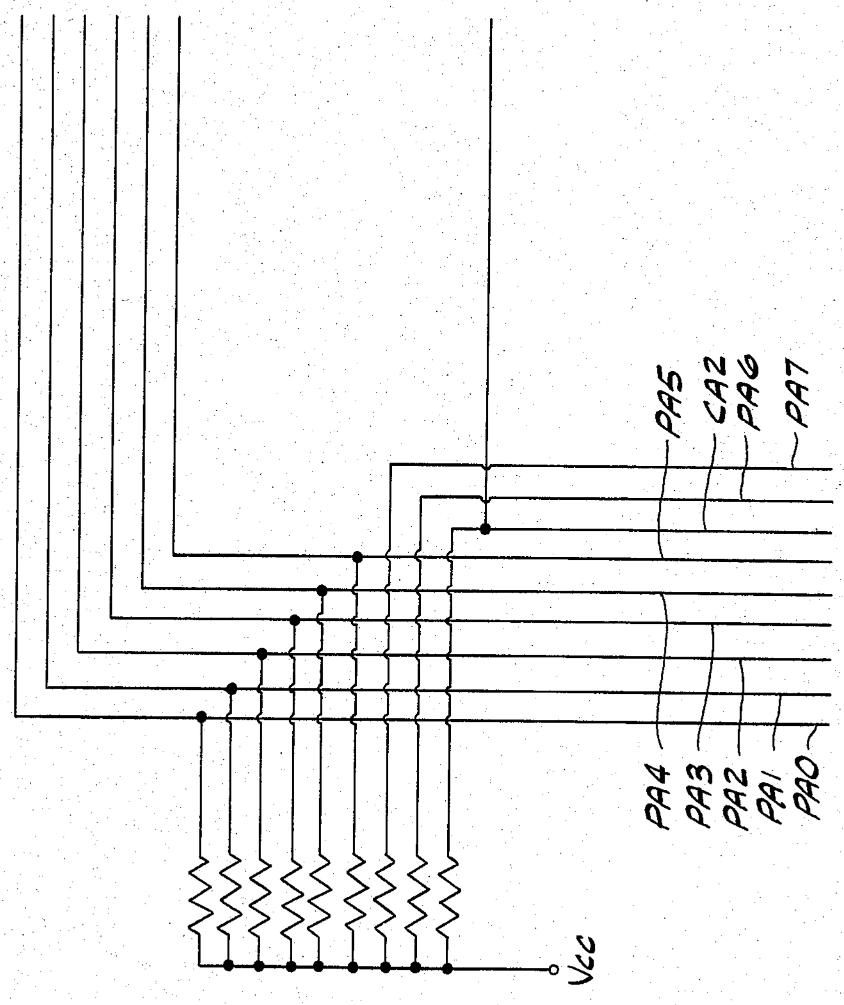

Controller 11 also includes (FIG. 3) a microcomputer (MPU) 17, which is preferably a Motorola 6802-type microcomputer, connected to a memory 19 consisting of both random access memory chips and read only memory chips, and to a peripheral interface adapter (PIA) 21 which is preferably a Motorola 6821-type PIA. The CB1 pin of PIA 21 is connected to a 16 msec. clock 23 which initiates a system interrupt every 16 msec. to synchronize the timing of the controller with the power line. The A-group of peripheral lines of PIA 21 are configured as outputs, as is pin CA2, while lines PB0–PB4 are configured as inputs. All these lines are suitably conditioned and connected to other parts of controller 11 via a plug P1 (FIGS. 3A,3B,3C).

Figure 3E:
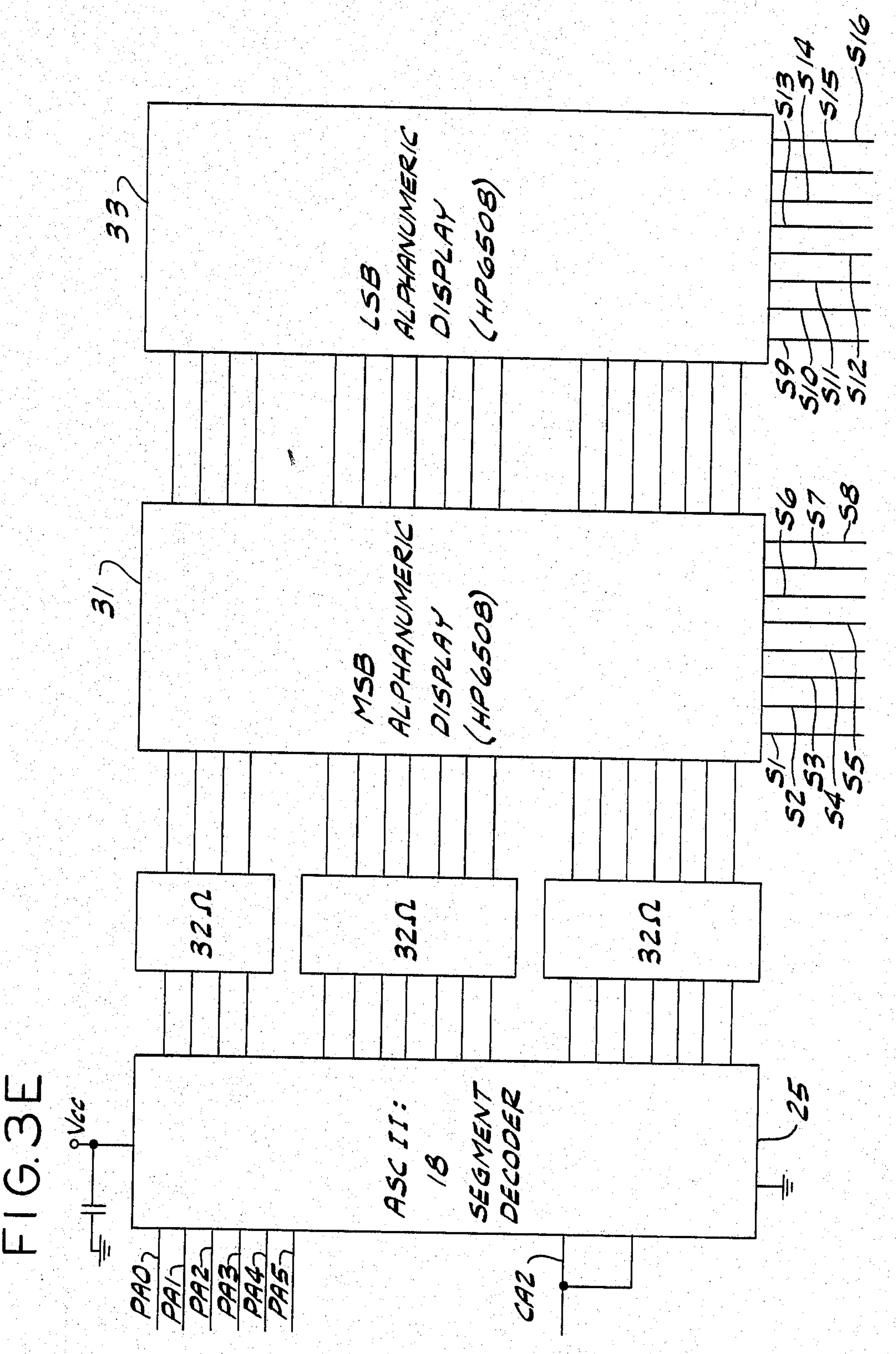

More specifically plug P1 connects lines PA0–PA5 and CA2 of PIA 21 to an ASCII:18 Segment Decoder 25 (FIG. 3E), which is preferably a Texas Instruments AC5947-type decoder, and lines PA0–PA2, PA4, and PA6–PA7 to two latching current sinks 27,29 (FIG. 3F), which are preferably Signetics NE 590-type sinks. The output of decoder 25 is supplied to two eight-character, alphanumeric displays 31,33, which are preferably Hewlett Packard 6508-type displays. These displays are arranged in a single row of sixteen characters and make up display 13. Current sinks 27 and 29 are connected to the select pins of displays 31 and 33 over sixteen output lines S1–S16 and determine in which position in displays 31 and 33 a particular alphanumeric character determined by the output of decoder 25 is displayed. Microcomputer 17 controls the characters displayed in displays 31,33 by sending the desired character in ASCII form via PIA 21 to decoder 25 and selects the proper position in displays 31,33 for that character by controlling sinks 27 and 29, again via PIA 21.

Figure 3F:
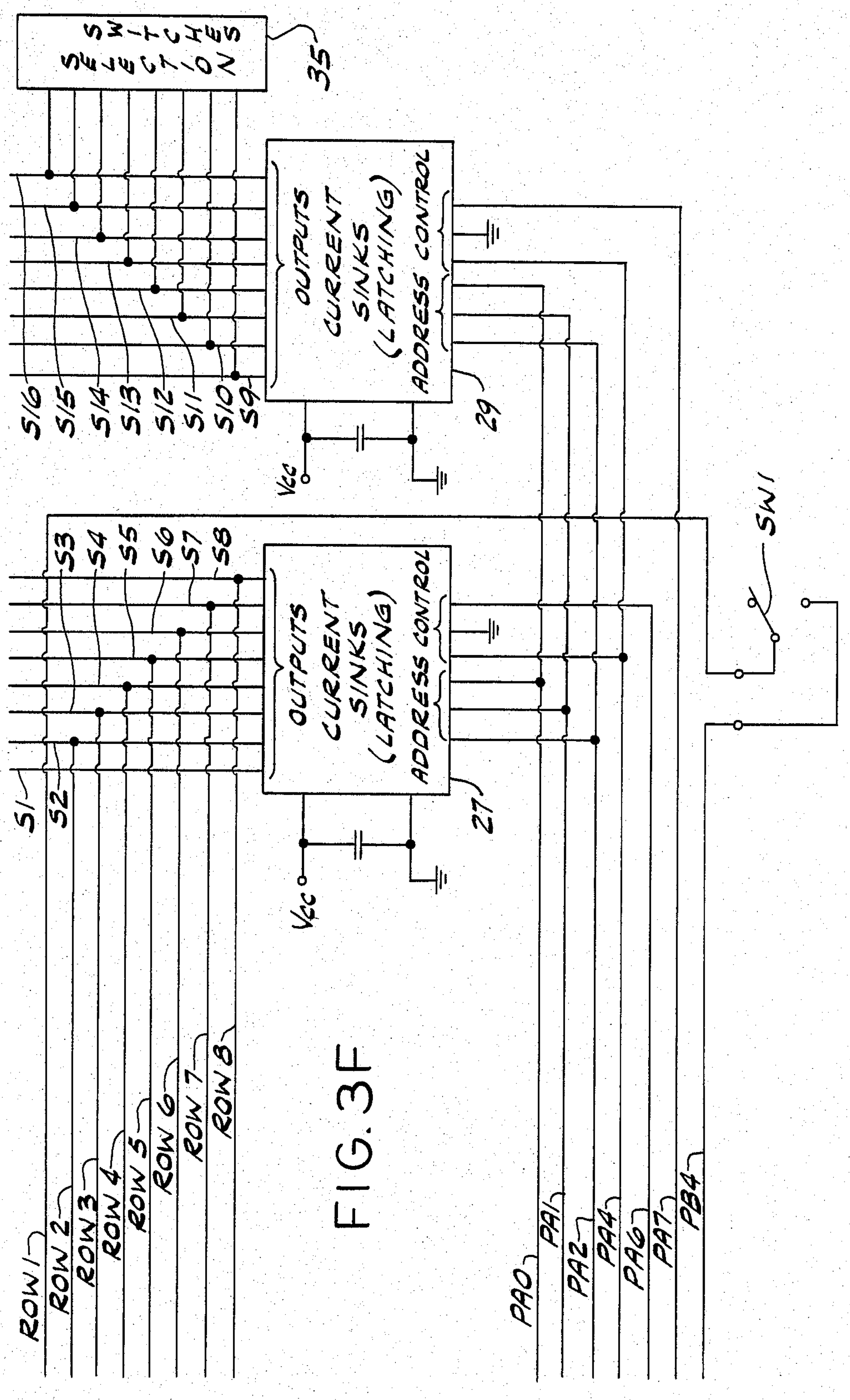

Also shown on FIG. 3F is a key-operated switch SW1 which is operated by data security key 15. Switch SW1 is connected via plug P1 to line PB4 of PIA 21 and to output S1 of current sink 27. MPU 17 reads the status of switch SW1 by causing output S1 of sink 27 to go low and reading the resulting voltage on line PB4. Of course, data security key 15 need not be a mechanical key. It could be a magnetically coded card or some similar security device. In this case key-operated switch SW1 would be replaced by a card reader.

Keyboard 14 (see FIG. 3B) is arranged in a matrix of four columns and eight rows. The rows are connected to the outputs of current sink 27 and the columns are connected via plug P1 to lines PB0–PB3 of PIA 21. To identify any particular closed switch, MPU 17 simply energizes the rows in turn by means of sink 27 and reads the resulting outputs for each column via lines PB0–PB3. Current sink 29 is similarly used in combination with input lines PB–PB3 of PIA 21 by suitable connections (not shown) to detect the closure of a set of selection switches 35 used in selecting items to be vended. MPU 17 is also connected to a coin unit and to the solenoids and switches of the vendor in a conventional manner. For clarity these elements of controller 11 are not shown. Illustrative of such connections are those shown in aforementioned U.S. Pat. No. 4,231,105.

Most of the switches on keyboard 14, other than the numeral switches, are lockable, and most have associated therewith a list or table. The TIME WATER switch, for example, is lockable, which means that by use of key 15 a supervisor or other person may lock or restrict access to the information associated with the TIME WATER switch. The table associated with this switch is as follows:

COFF WATER
DECAF/T WAT
CHOC WATER
SOUP WATER

The first item in the table is the quantity of water used to brew coffee in the vendor and is represented by the alphanumeric designation COFF WATER. The second item is the quantity of water used for decaffeinated coffee or tea, the third the quantity of water used for making chocolate, and the fourth the quantity of water for making soup. Assuming the TIME WATER switch is not locked, MPU 17 is responsive to a first actuation of the TIME WATER switch to display the alphanumeric designation COFF WATER along with the coffee water quantity data stored in memory 19. A second actuation results in display of the designation DECAF/T WAT along with the corresponding data and so on. By repeated actuations of the TIME WATER switch, one can display all the designations in the table (in sequence) and the associated data in displays 31, 33.

The TIME INGRD'T switch is also lockable. It is used to retrieve and display the data on the various dry ingredient throws, along with the corresponding alphanumeric designations, for the products vended by the vendor. Its table is as follows:

| Designation | Meaning |
|---|---|
| SUGAR | Sugar Throw |
| EXT SUGAR | Extra Sugar Throw |
| LIGHTNER | Lightner Throw |
| EXT LIGHT | Extra Lightner Throw |
| NORM DECAF | Normal Decaffeinated Coffee Throw |
| STNG DECAF | Strong Decaffeinated Coffee Throw |
| XST DECAF | Extra-Strong Decaffeinated Coffee Throw |
| NORM TEA | Normal Tea Throw |
| STNG TEA | Strong Tea Throw |
| XSTNG TEA | Extra-Strong Tea Throw |
| CHOC INGRED | Chocolate Ingredient Throw |
| SOUP INGRD | Soup Ingredient Throw |
| N FD COFF | Normal Freeze-Dried Coffee Throw |

-continued

| Designation | Meaning |
|---|---|
| ST FD COFF | Strong Freeze-dried Coffee Throw |
| XS FD COFF | Extra-Strong Freeze-Dried Coffee Throw |

Just as in the case of the TIME WATER selector, repeated actuations of the TIME INGRED'T switch, if access to the data is unlocked, result in the alphanumeric designations and the corresponding data from the memory being sequentially displayed in displays 31, 33. And the TIME INGRED'T switch is locked in exactly the same way as the TIME WATER switch.

The TIME MISC switch is lockable and its table is as follows:

| Designation | |
|---|---|
| YEAR | NORM BREW |
| MONTH | STNG BREW |
| DAY | XSTNG BREW |
| HOUR | COMPRESSOR |
| MINUTE | |

The first five items in the table represent an internal record of real time which is generated by a clock/calendar integrated circuit chip, which preferably is an MSM 5832-type chip from OKI Semiconductor of Santa Clara, Calif. The last four items are times used in the brewing of coffee.

The TEST THROW switch is lockable but does not have a table associated with it. It is used in conjunction with the TIME INGRED'T switch to test the various throws of the vendor. To do this, assuming both switches are unlocked, the route man causes the desired throw to be displayed in display 13, by pressing the TIME INGRED'T switch the necessary number of times, and then presses the TEST THROW switch. This causes the desired throw to occur without a vend taking place. If the throw is too short or too long, the route man can then change the number displayed in display 13 up or down as needed to lengthen or shorten the throw.

The DIAGNOSTIC DISPLAY switch is lockable and has a list associated therewith as follows:

Designation

SELECTOR TEST
DROP CUP
DISPLAY TEST *
DISPLAY TEST O
DISPLAY TEST:
WHIPPER TEST
AUTO DOOR TEST
HOPPER TEST
BREWER TEST

The display tests cause various different symbols to be displayed in display 13 to ensure that the displays are functioning properly. The other tests are self-explanatory. To run a diagnostic test, assuming access thereto is unlocked, one causes the designation of the desired test to be displayed in display 13 by actuating the DIAGNOSTIC DISPLAY switch as many times as necessary and then pressing the DIAGNOSTIC RUN switch. This latter switch is not lockable and has no list associated with it.

The STAR switch has no list and is not lockable. It is used in conjunction with the supervisor's key to lock and unlock access to the data and lists associated with the various keys.

The TEST VEND switch is similar to the TEST THROW switch except that it is used to run vends instead of throws. It is lockable but has no list. To run a test vend, one actuates the TEST VEND switch to display the alphanumeric designation "TEST VEND" and then actuates the selection switch corresponding to the desired vend.

The CLEAR switch is not lockable and has no list.

The PRICE SET switch is used to check and set prices for the items to be vended. In this embodiment its table is as follows:

COFFEE
DECAF
TEA
CHOC
SOUP

It is lockable, but if unlocked one can obtain the price of any product by pressing the PRICE SET switch the necessary number of times.

The FREE VEND switch is lockable but has no list associated with it. It is used in conjunction with the PRICE SET switch to set individual items or the whole machine on free vend.

The CYCLE COUNT switch is lockable and its table is:

| Designation | Resettable | Meaning |
|---|---|---|
| VENDS | No | Total number of vends for the machine |
| COFF CNT | Yes | Number of coffee vends |
| FREE COF | Yes | Number of free coffee vends |
| DCAF CNT | Yes | Number of decaffeinated coffee vends |
| FREE DEC | Yes | Number of free decaffeinated coffee vends |
| TEA CNT | Yes | Number of tea vends |
| FREE TEA | Yes | Number of free tea vends |
| CHOC CNT | Yes | Number of chocolate vends |
| FREE CHOC | Yes | Number of free chocolate vends |
| SOUP CNT | Yes | Number of soup vends |
| FREE SUP | Yes | Number of free soup vends |
| BR SAN | No | Number of brewer sanitizing cycles |
| RINSE | No | Number of rinse cycles |

The data in this table is updated by MPU 17 whenever a corresponding event occurs.

The CASH SALES switch is also lockable and its table is:

| Designation | Resettable | Meaning |
|---|---|---|
| MACHINE ID | Yes | Machine ID number |
| ACC CODE | Yes | Access code for retrieving locked data without a supervisor's key |
| SALES | No | Total machine sales |
| COFFEE $ | Yes | Coffee sales |
| DECAF $ | Yes | Decaffeinated coffee sales |
| TEA $ | Yes | Tea sales |
| CHOC $ | Yes | Chocolate sales |
| SOUP $ | Yes | Soup sales |

The DATA RESET switch is used in conjunction with the CYCLE COUNT and CASH SALES switches to reset resettable data.

Figure 4:
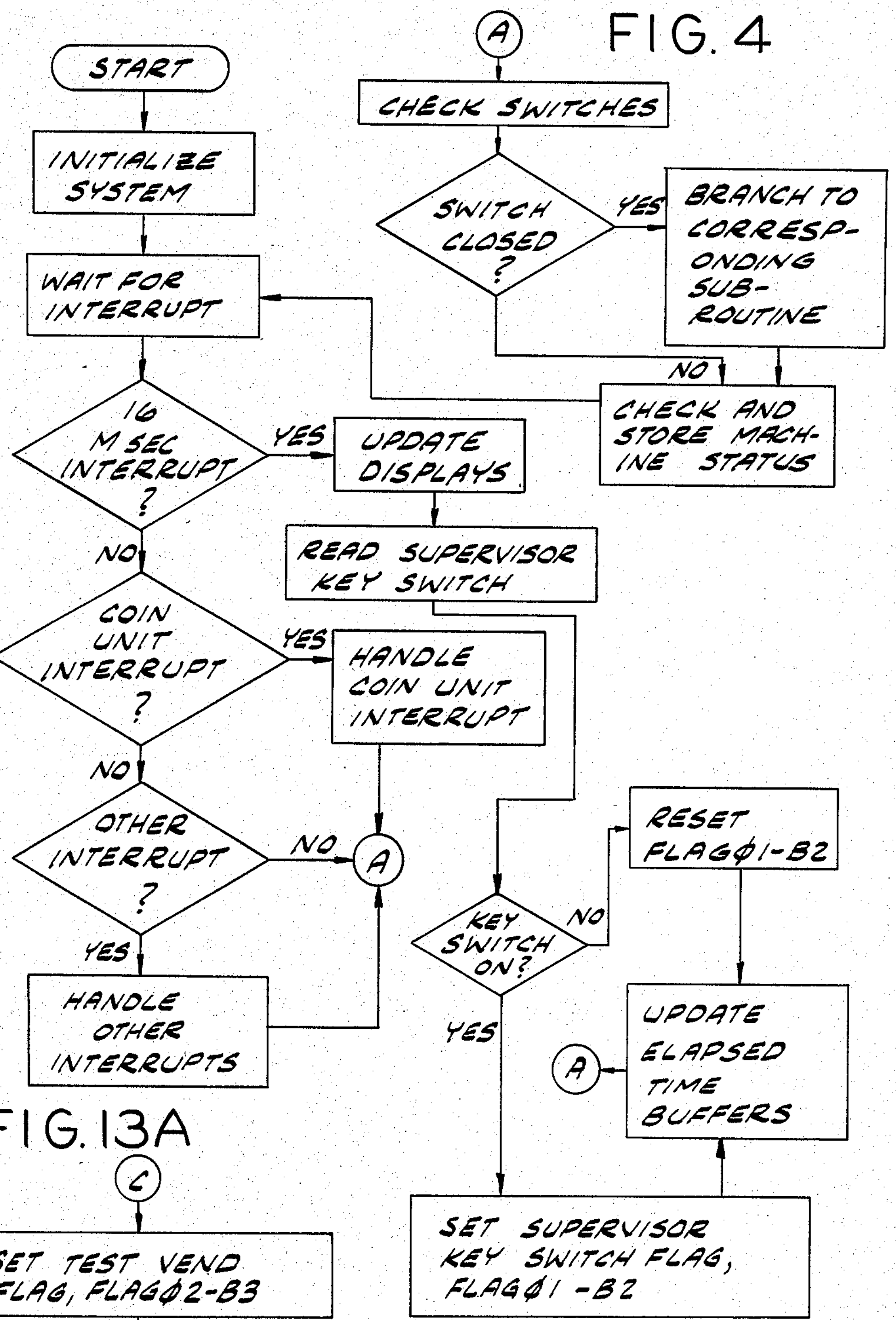
FIG. 4 is a flow chart of the standby loop of the program for the circuitry shown in FIGS. 3 and 3A–3F.

The operation of controller 11 can be better understood by referring to the program flowchart for MPU 17 (FIGS. 4-16). Referring to FIG. 4, at the start of its program, MPU 17 initializes the system (clears various flags, etc.) and waits for an interrupt to synchronize the display with the ac line. Once an interrupt occurs, MPU 17 first checks if it was a 16 msec. interrupt (initiated by clock 23). If it was, MPU 17 refreshes display 13 and reads the supervisor key switch, SW1. If the switch is on, i.e., closed, bit 2 of a flag FLAG01 is set (made a 1). If the supervisor key is not on, i.e., if switch SW1 is not closed, FLAG01-B2 is reset (a zero). Next in the 16 msec. interrupt MPU 17 updates the elapsed time buffers which keep track of real time and such times as the amount of time the vendor door is open, and then returns from the interrupt. Handling of other interrupts, such as interrupts from the coin unit, is similar but does not constitute part of this invention. The next step after MPU 17 waits for and performs an interrupt is to check for closure of the switches of keyboard 14 and any selection switches. If a switch is closed, MPU 17 jumps to the subroutine corresponding to the closed switch (see FIGS. 5–16) to service the switch closure. These routines are described below. After servicing any switch closures, MPU 17 checks and stores the machine status, which includes such things as motor positions, door positions, and low water levels, and returns to wait for an interrupt.

Figure 5:
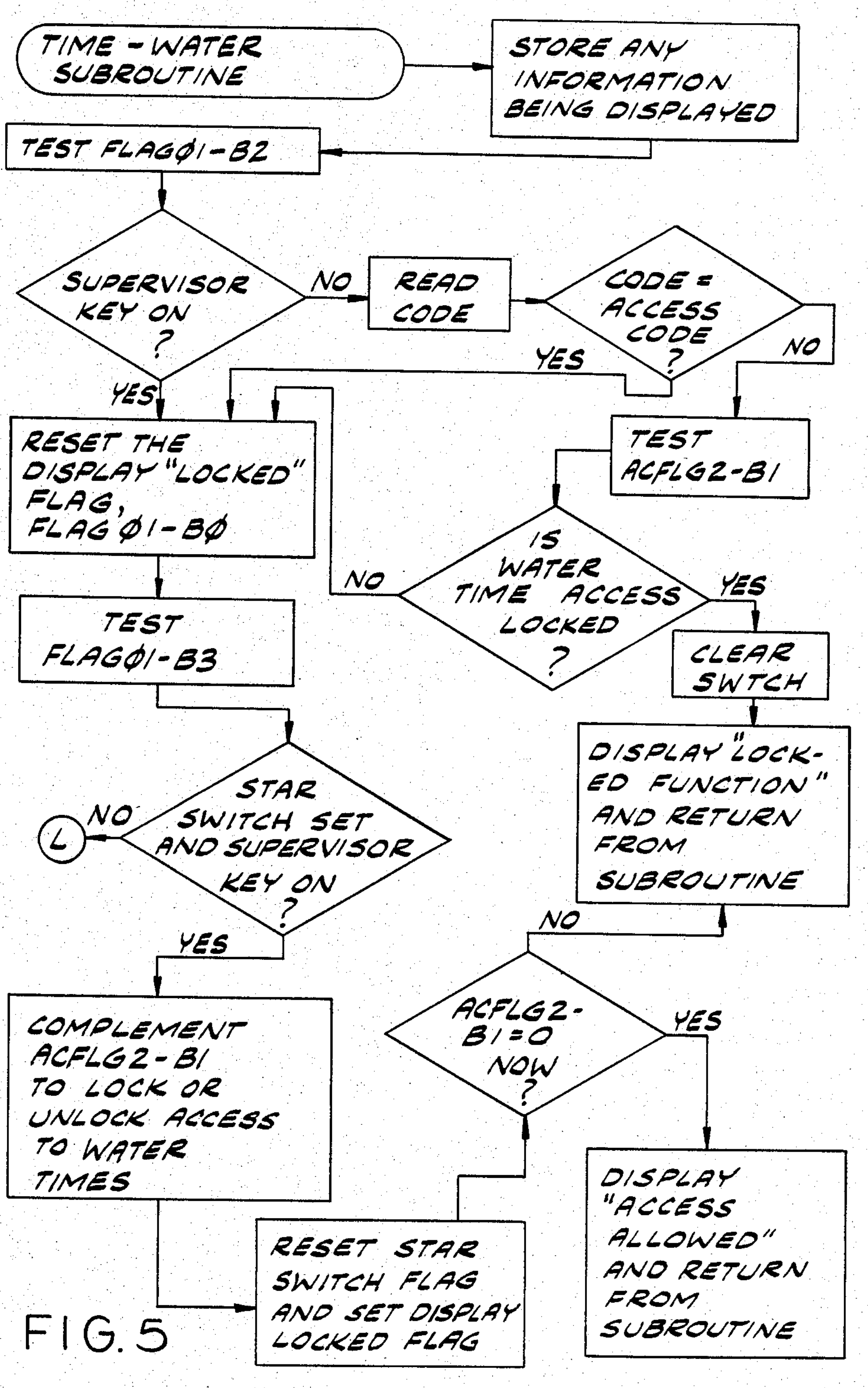
FIGS. 5 and 5A are the flow chart for the TIME WATER subroutine of the program for the circuitry shown in FIGS. 3 and 3A–3F.
Figure 5A:
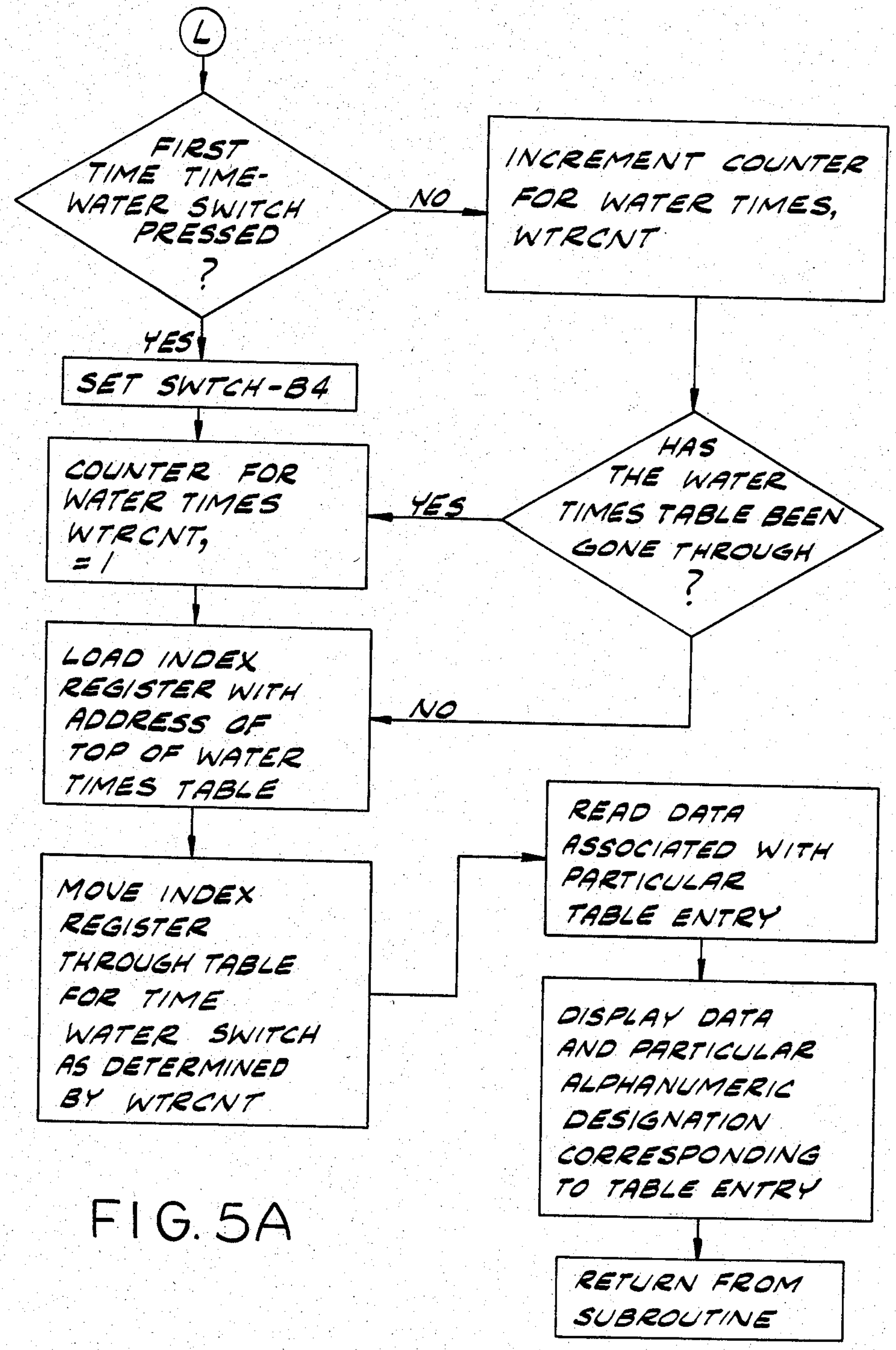

Assuming that the TIME-WATER selector is pressed, MPU 17 detects this and initiates the TIME-WATER subroutine (FIGS. 5 and 5A). As the first step in this subroutine, MPU 17 stores and checks any data displayed on display 13 in memory. Thus, the TIME-WATER switch at this time functions as an enter button for displayed data. Most of the other non-numeric switches also perform this function. After storing any displayed information in memory, MPU 17 checks FLAG01-B2 to determine if the supervisor or data security key is on. If it is on, all data is accessible, although access may be locked for entry or viewing without a supervisor's key, so MPU 17 resets (makes 0) bit 0 of FLAG01, which is the flag MPU 17 checks to determine whether or not the message displayed in the display may be changed. After resetting the display locked flag, MPU 17 tests FLAG01-B3 to see if the STAR switch has been set. If it has been set this means the supervisor is trying to lock or unlock access to the data associated with the TIME-WATER switch. In this case, MPU 17 then complements bit 1 of an access flag ACFLG2 to lock or unlock access to water times or quantities. After changing the state of ACFLG2-B1, MPU 17 resets the STAR switch flag, which means that the STAR switch must be actuated each time one wants to lock or unlock access to data corresponding to a given switch. If ACFLG2-B1 now equals zero, access is unlocked, so MPU 17 displays "ACCESS ALLOWED" in display 13, sets the display locked flag so that the "ACCESS ALLOWED" message will remain on the display, and returns from the subroutine. If, on the other hand ACFLG2-B2=1 now, access is locked and MPU 17 displays "FUNCTION LOCKED", sets the display locked flag, and returns from the subroutine.

Assume that the supervisor key is on but the STAR switch flag was not set. In this case the supervisor is not trying to lock or unlock access to water quantity data, so MPU branches to the flowchart shown on FIG. 5A. The first step in this part of the program is determining whether or not this is the first time the TIME-WATER switch has been actuated in this series of actuations of that switch. If it is the first actuation, a flag SWTCH-B4 is set to indicate that the TIME-WATER switch has been closed and a counter for water quantities, WTRCNT, is set equal to 1. If not the first actuation, flag SWTCH-B4 will already be set and the water quantity counter is incremented by 1. In this latter case, MPU 17 then checks if the water time list or table has been completed. If so WTRCNT is reset to 1. Whether or not the table has been completed, the index register of MPU 17 is then loaded with the address of the top of the water quantities table. It is then moved through the table an amount corresponding to the value of WTRCNT to point at the element of the table corresponding to the number of times the TIME-WATER switch has been actuated. MPU 17 then reads from memory the data associated with that particular table element or entry and displays that data and the alphanumeric designation for that table entry. It thereupon returns from the TIME-WATER subroutine.

Until this point, we have assumed that the supervisor key is on. If it is not on, MPU 17 branches to read the buffer CODE which is a number previously entered into the controller by the person seeking access to the data. MPU 17 compares CODE with a numeric access code previously set by the supervisor using key 15 and the numeric keys of controller 11. If they are the same, the person without a key is authorized to obtain access to locked data, so MPU 17 resets the display locked flag, FLAG01-B0. In this case the check of the STAR switch flag is redundant because no one without a key is authorized to lock and unlock data. MPU 17 determines that the supervisor key is not on and branches to the flowchart, described above, of FIG. 5A.

On the other hand, if the supervisor key is not on and the proper code has not been entered, MPU 17 tests the water quantity access flag, ACFLG2-B1, to see if access to water quantities is locked. If access is not locked, the program continues as though a valid access code were entered above. If access is locked, however, the buffer SWTCH, which contains the switch closure information, is cleared, "FUNCTION LOCKED" is displayed, the display locked flag is set, and MPU 17 returns from the TIME-WATER subroutine.

Figure 6:
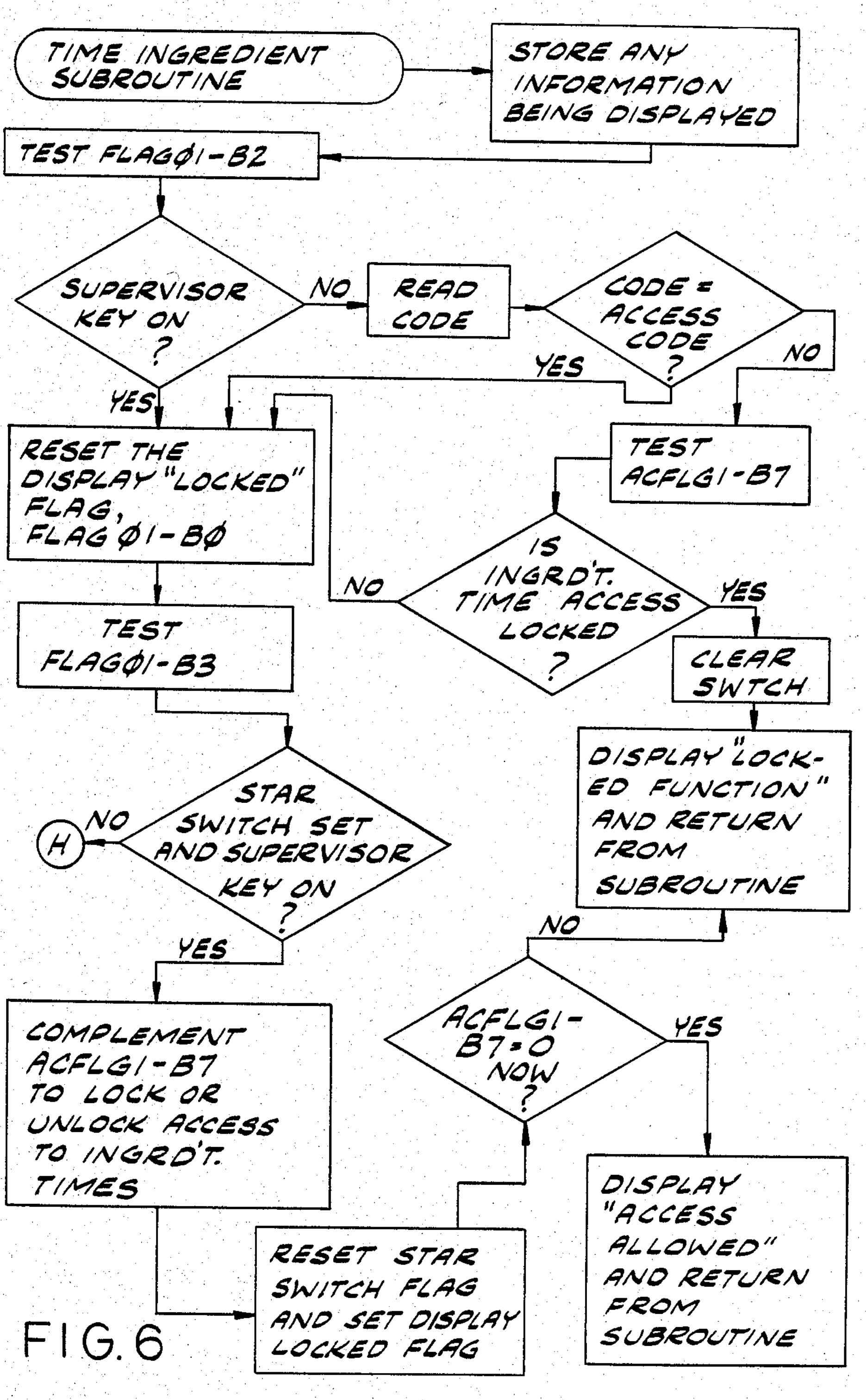
FIGS. 6 and 6A are the flow chart for the TIME INGREDIENT subroutine of the program for the circuitry shown in FIGS. 3 and 3A–3F.
Figure 6A:
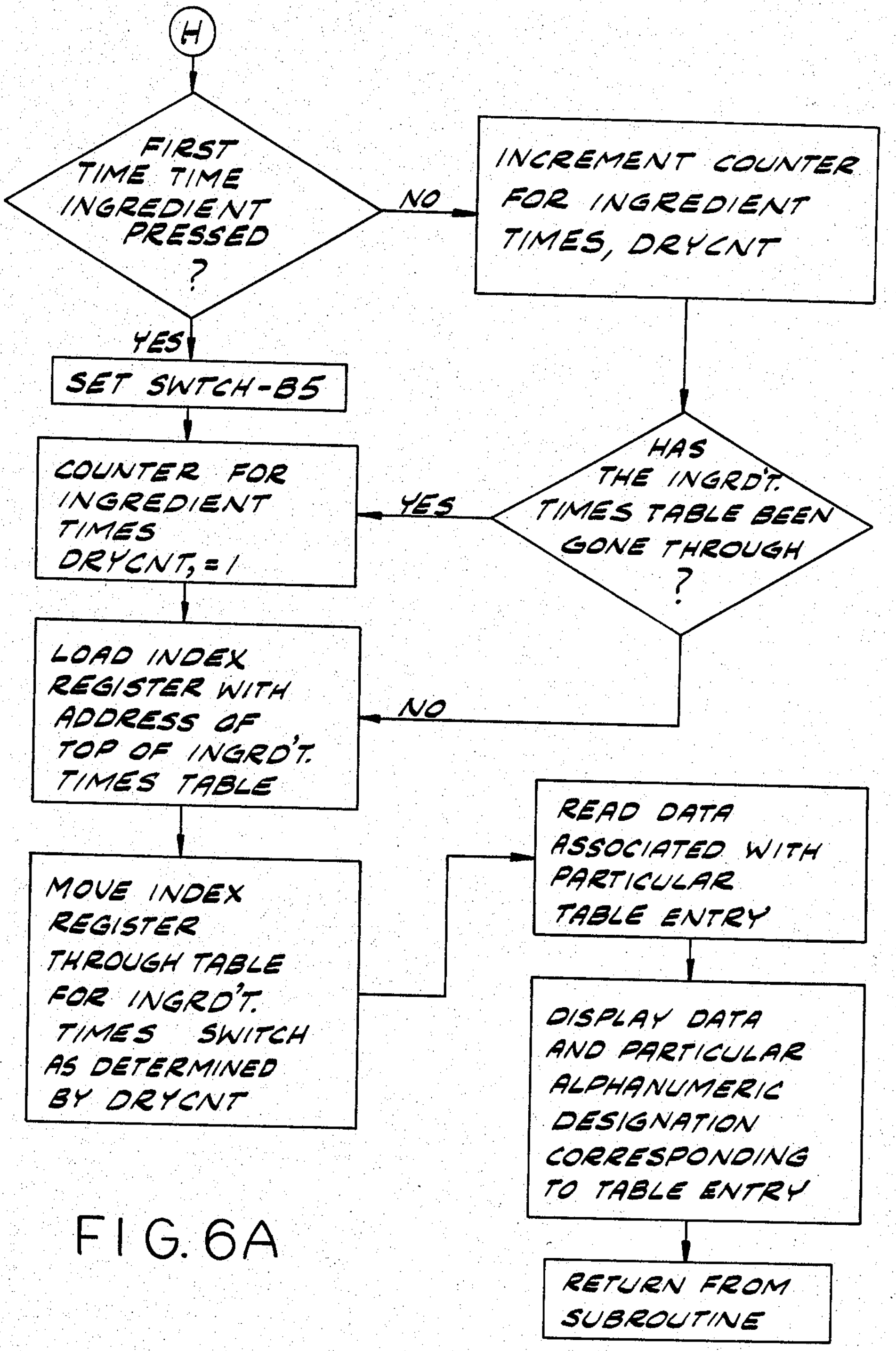

When a person wants to check or change an ingredient throw, he presses the TIME INGRD'T switch which causes MPU 17 to branch to the TIME INGREDIENT subroutine (FIGS. 6 and 6A). This subroutine is identical to that of the water quantities except that the access flag for ingredient throws is ACFLG1-B7, the counter for the TIME INGRD'T switch is DRYCNT, the flag for closure of this switch is SWTCH-B5, and the table used is the Ingredient Table. Actuating the TIME INGRD'T switch, if access is unlocked, causes display of one of the alphanumeric designations from the table and repeated actuations result in sequential display of the designations and the corresponding data.

Figure 7:
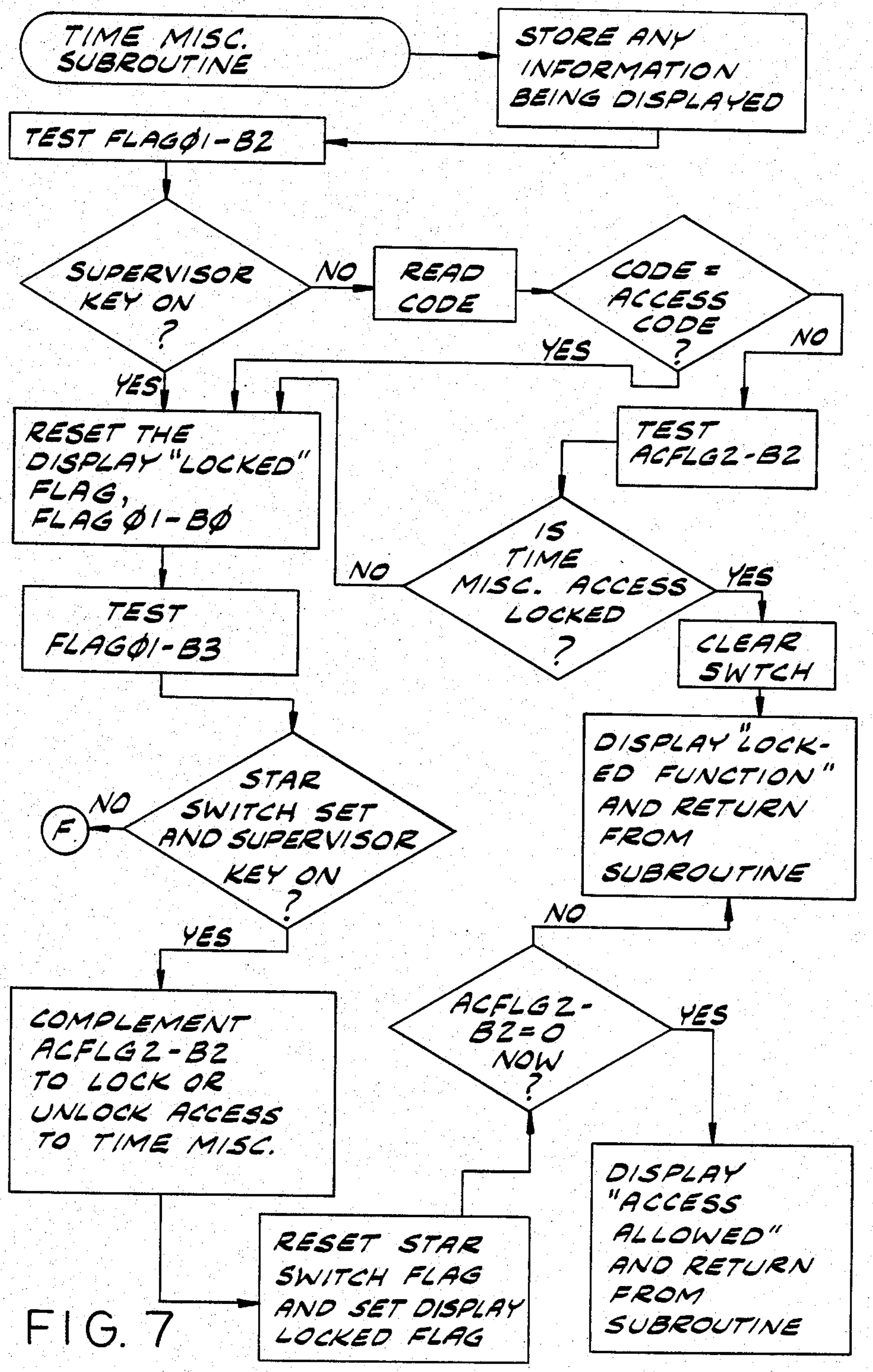
FIGS. 7 and 7A are the flow chart for the MISCELLANEOUS TIMES subroutine of the program for the circuitry shown in FIGS. 3 and 3A–3F.
Figure 7A:
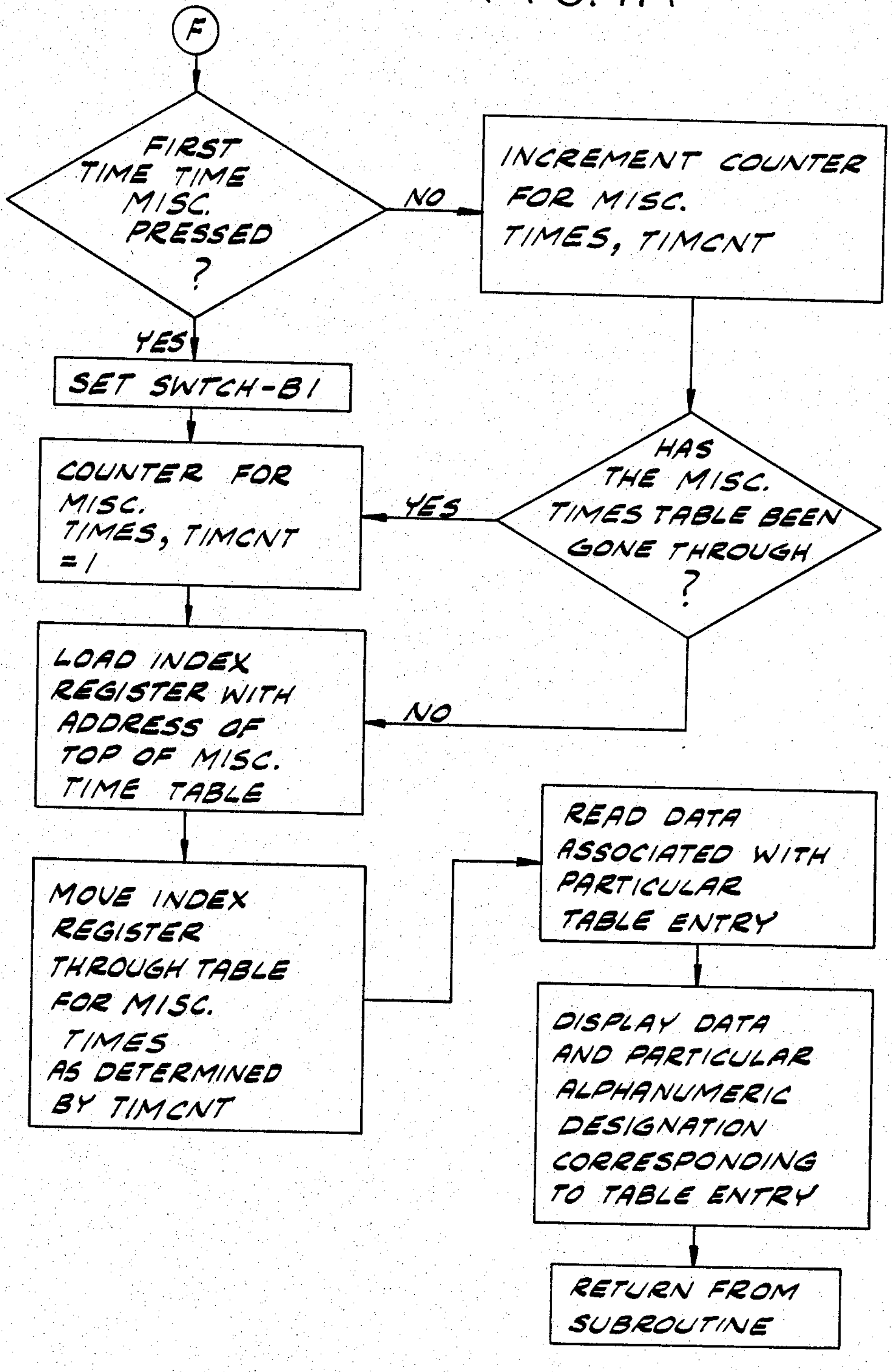
Figure 8:
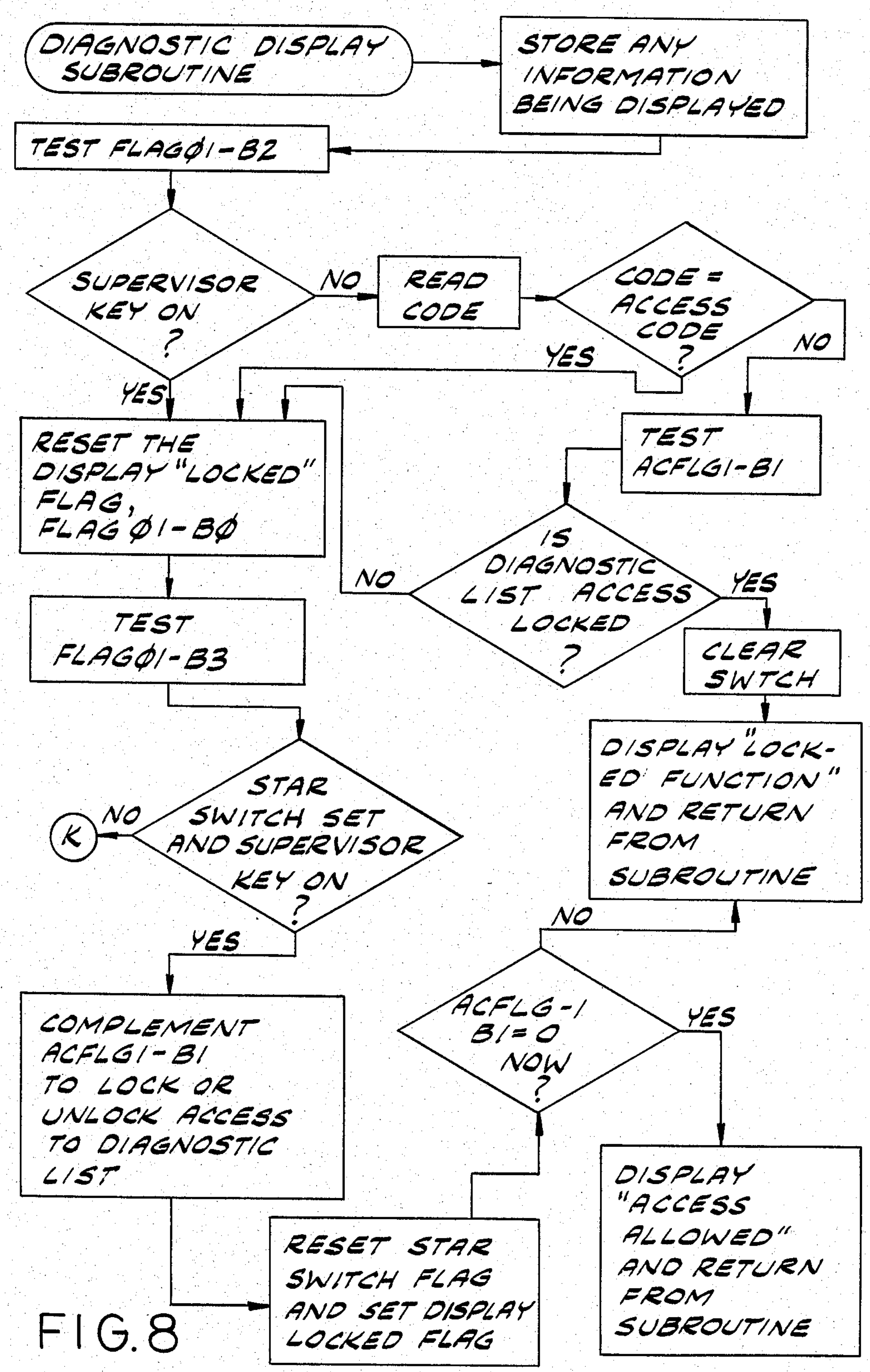
FIGS. 8 and 8A are the flow chart for the DIAGNOSTIC DISPLAY subroutine of the program for the circuitry shown in FIGS. 3 and 3A–3F.
Figure 8A:
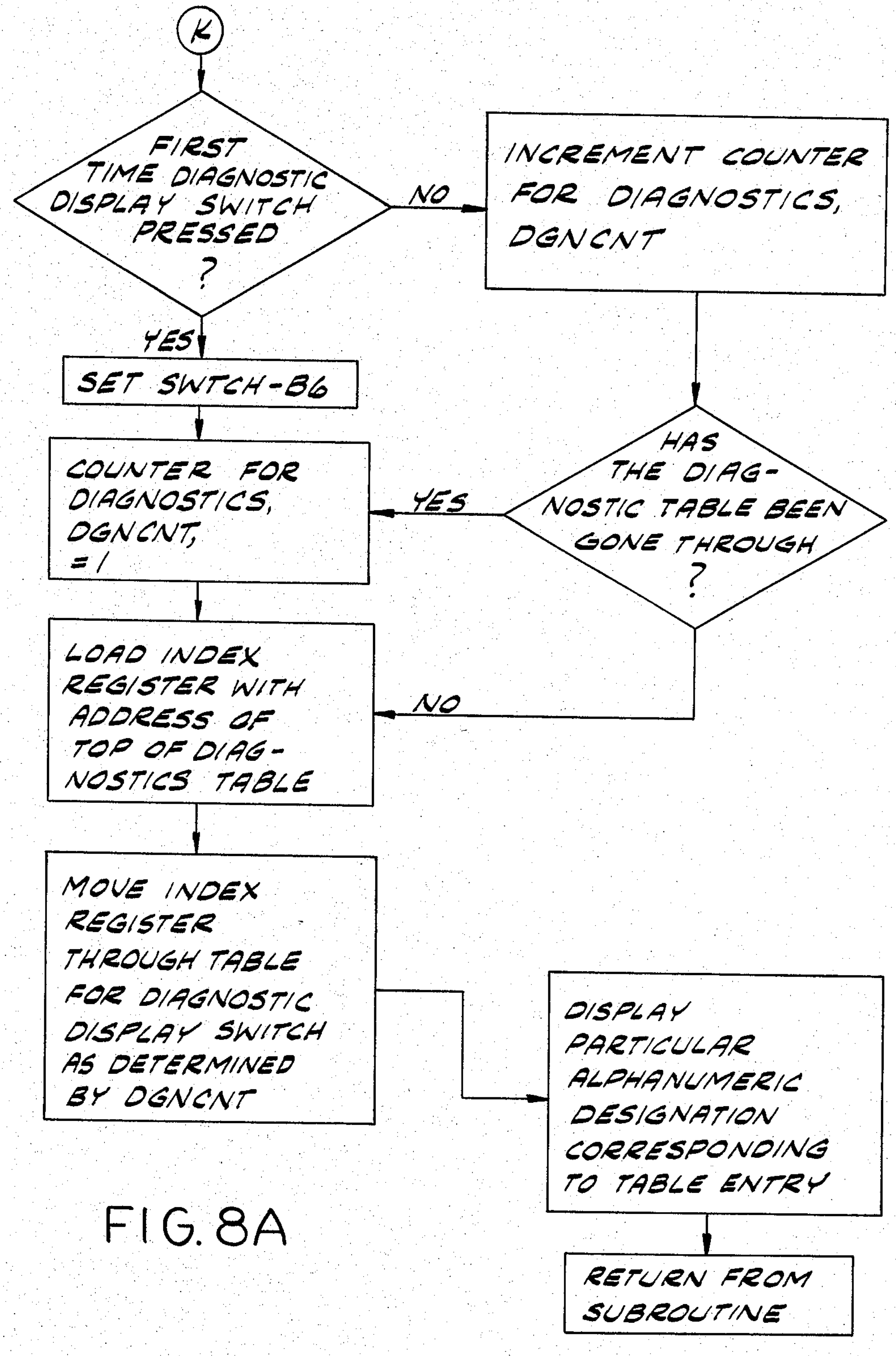
Figure 9:
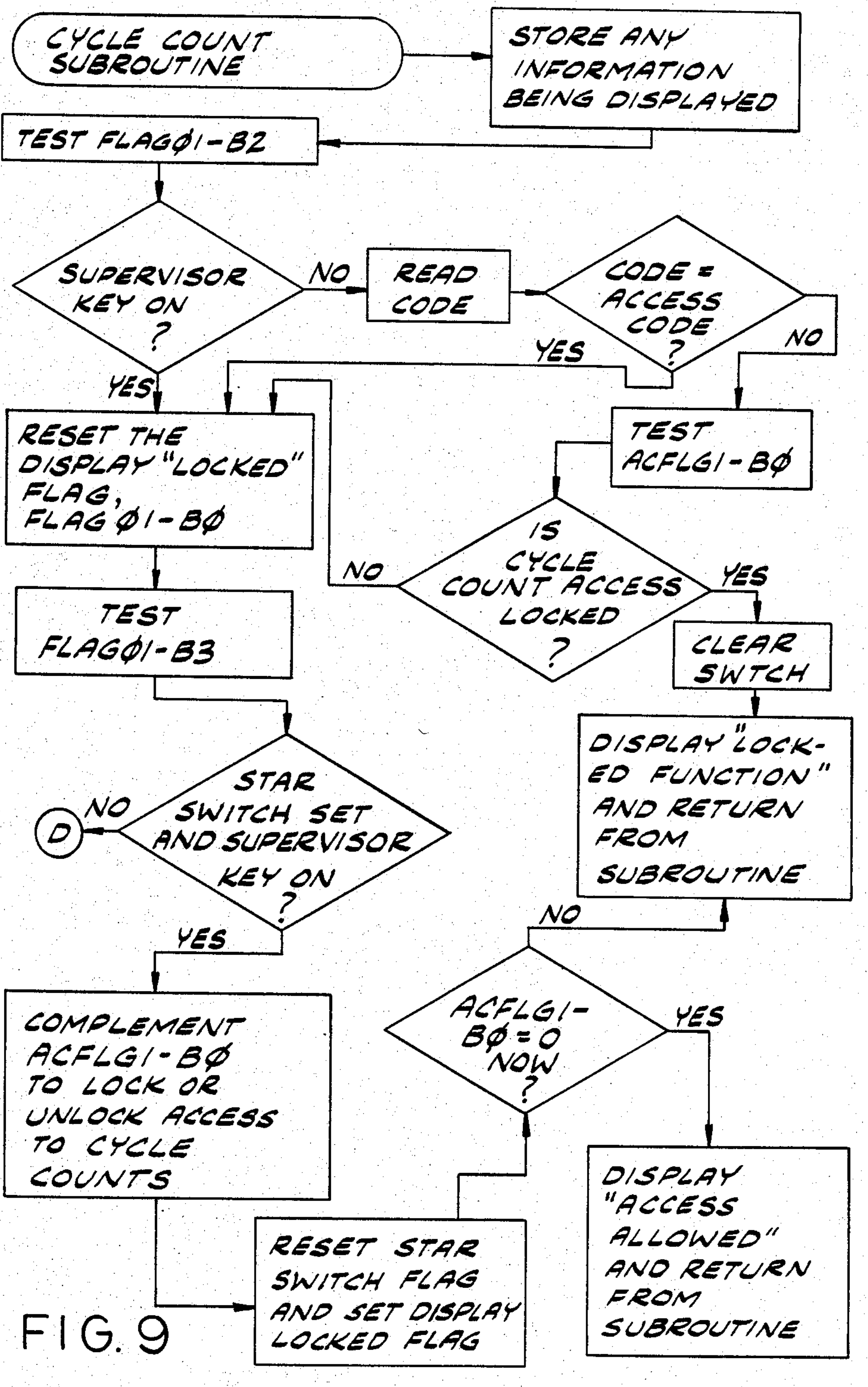
FIGS. 9 and 9A are the flow chart for the CYCLE COUNT subroutine of the program for the circuitry shown in FIGS. 3 and 3A–3F.
Figure 9A:
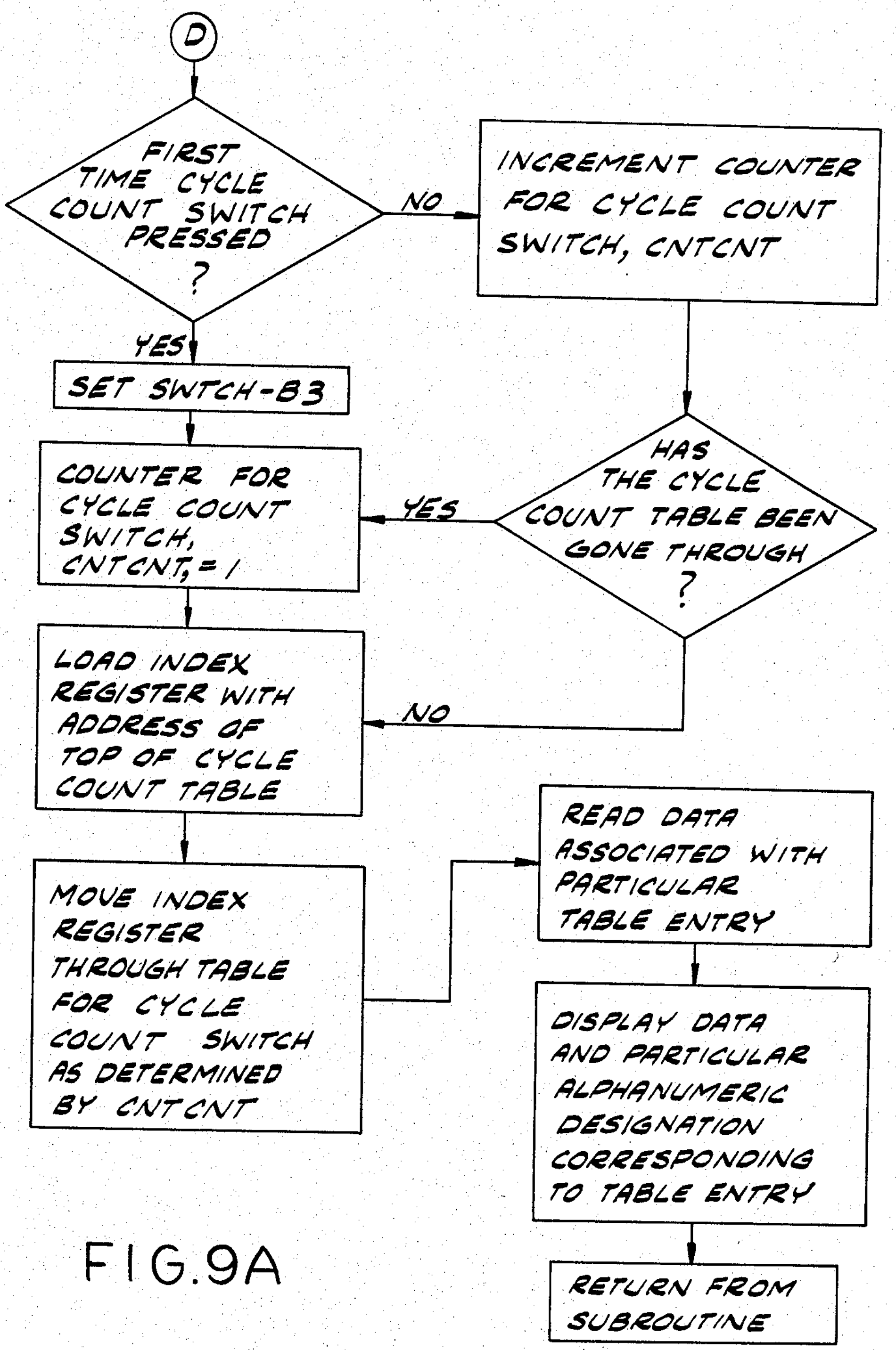
Figure 10:
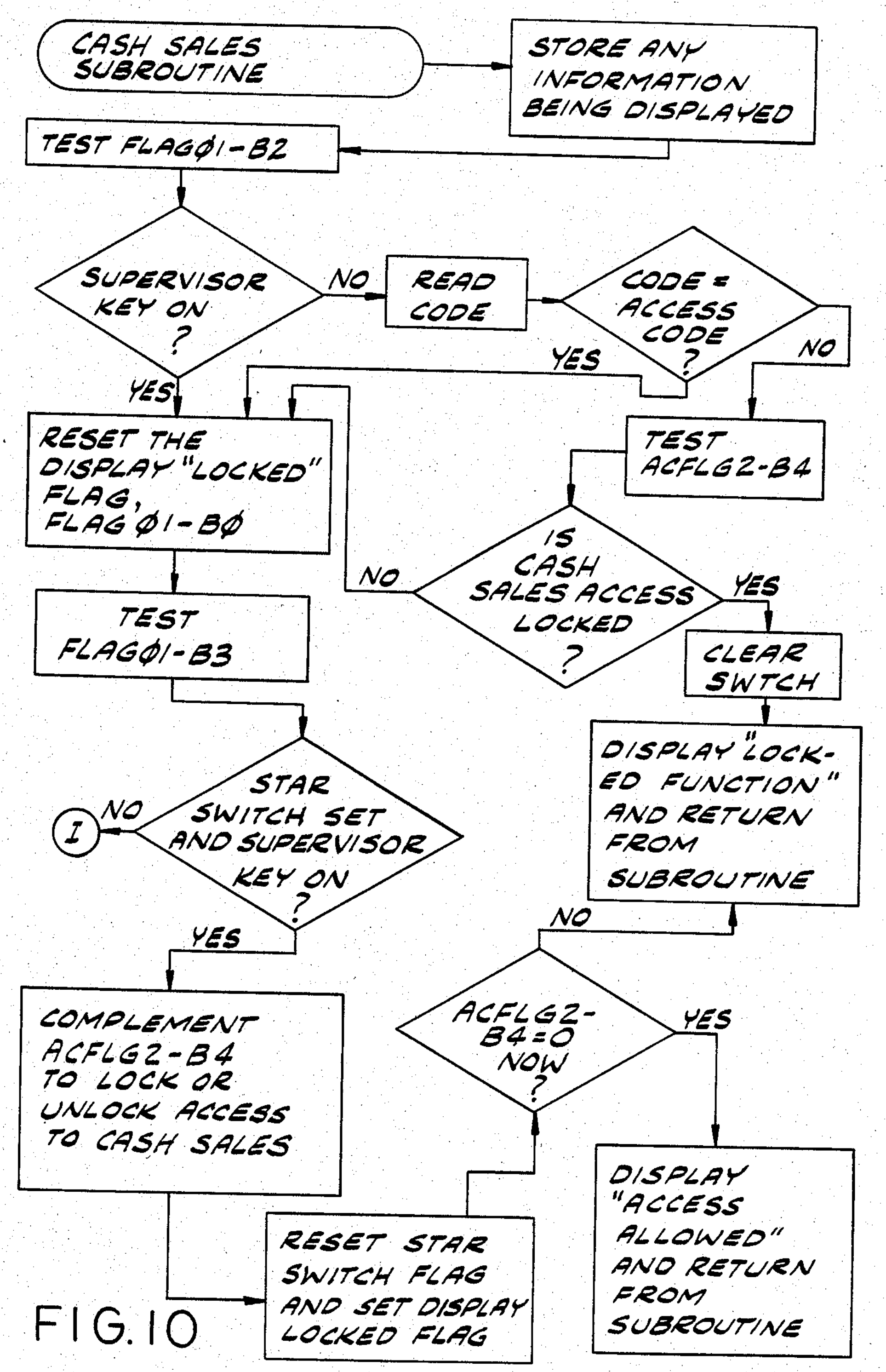
FIGS. 10 and 10A are the flow chart for the CASH SALES subroutine of the program for the circuitry shown in FIGS. 3 and 3A–3F.
Figure 10A:
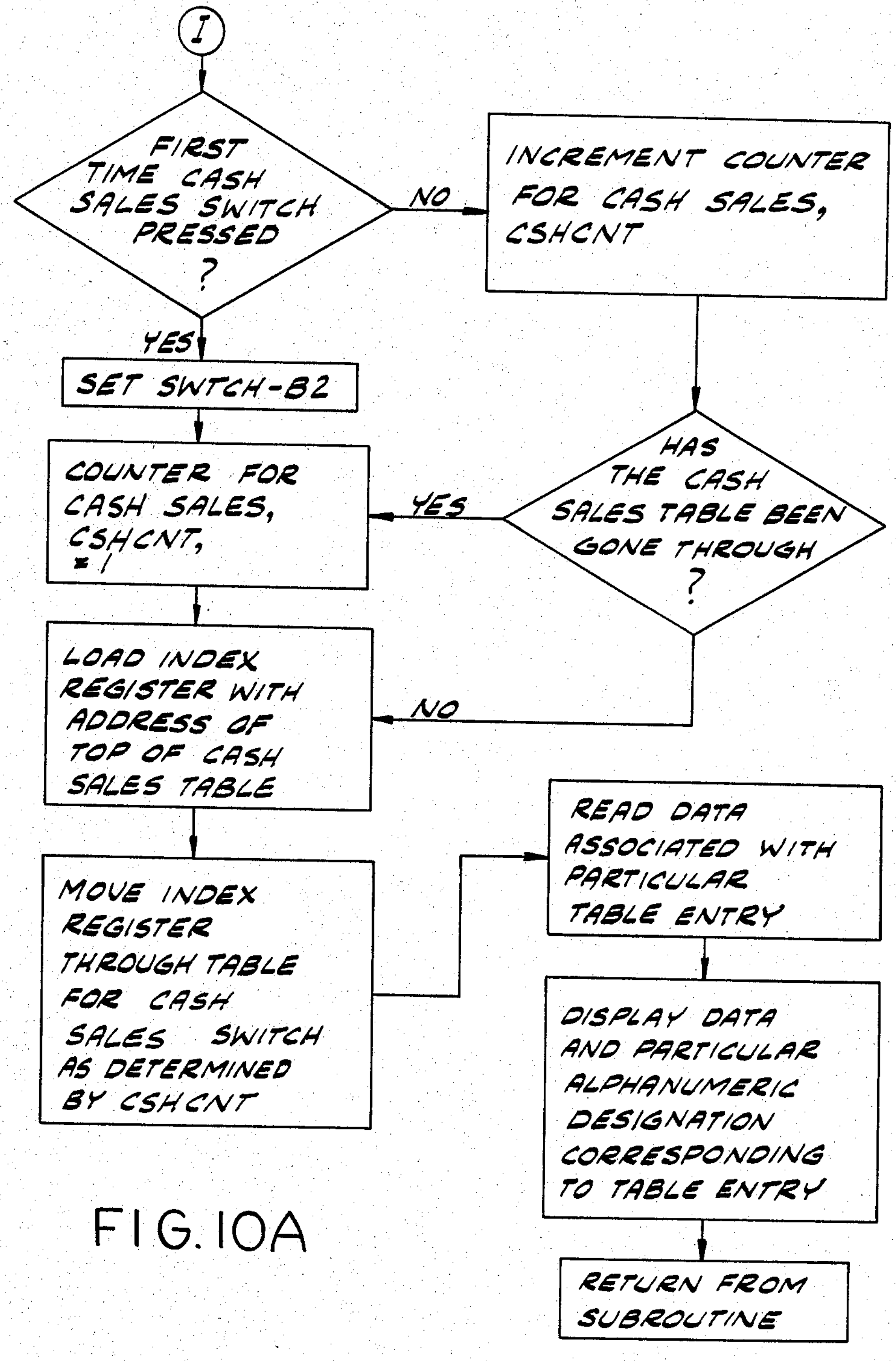

Similarly, the TIME MISC (FIGS. 7 and 7A), DIAGNOSTIC DISPLAY (FIGS. 8 and 8A), CYCLE COUNT (FIGS. 9 and 9A), and CASH SALES (FIGS. 10 and 10A) subroutines are identical to the TIME WATER and TIME INGRD'T subroutines except for the following items:

| | Access Flag | Counter | Switch Flag | Table |
|---|---|---|---|---|
| TIME MISC | ACFLG2-B2 | TIMCNT | SWTCH-B1 | Miscellaneous Times |
| DIAGNOSTIC DISPLAY | ACFLG1-B1 | DGNCNT | SWTCH-B6 | Diagnostic List |
| CYCLE COUNT | ACFLG1-B0 | CNTCNT | SWTCH-B3 | Cycle Count |
| CASH SALES | ACFLG2-B4 | CSHCNT | SWTCH-B2 | Cash Sales |

In addition, since there is no data associated with the DIAGNOSTIC DISPLAY table, MPU 17 does not read any data in that subroutine but merely displays the appropriate alphanumeric designation from the diagnostic test list.

Figure 11:
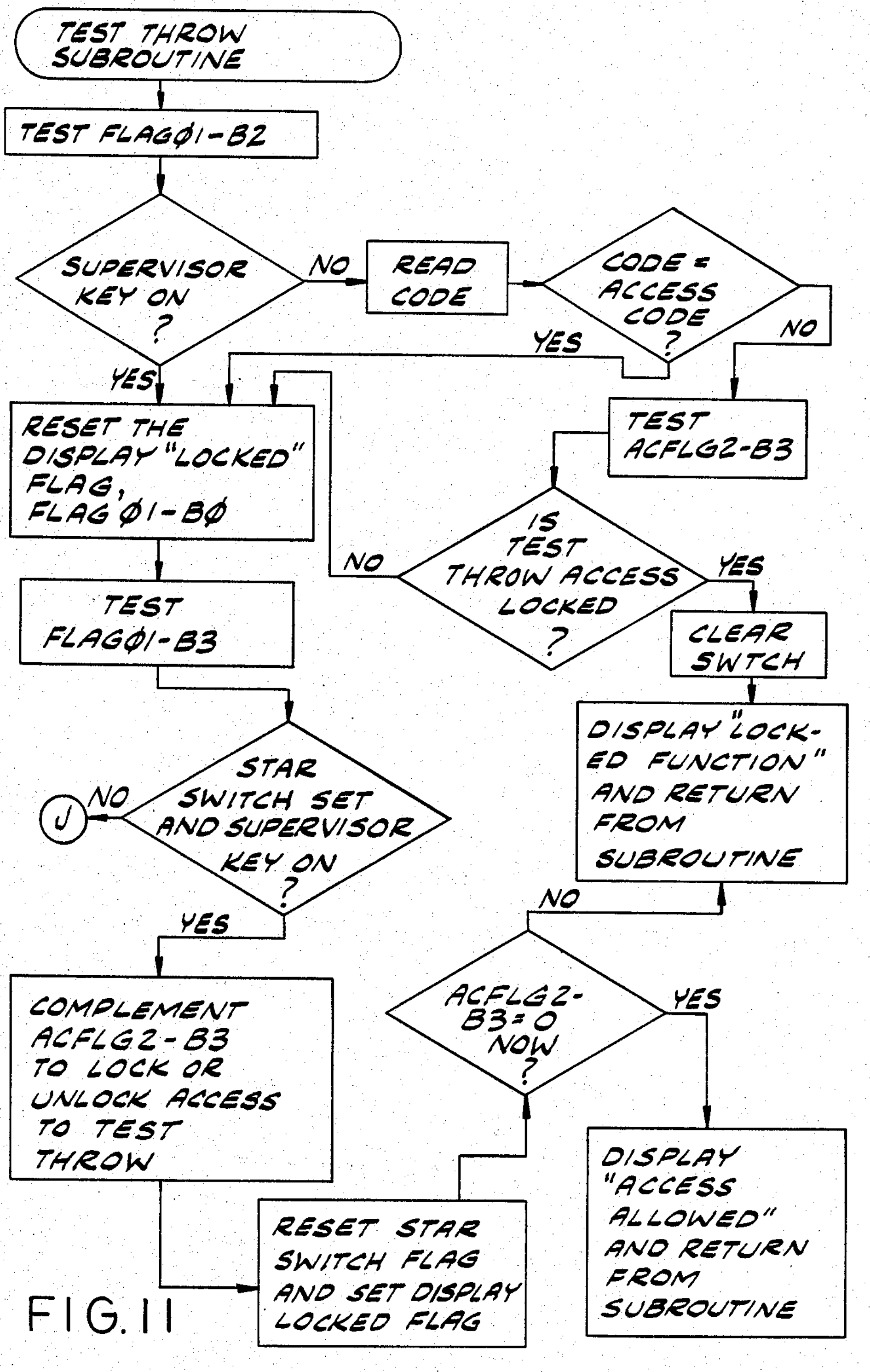
FIGS. 11 and 11A are the flow chart for the TEST THROW subroutine of the program for the circuitry shown in FIGS. 3 and 3A–3F.
Figure 11A:
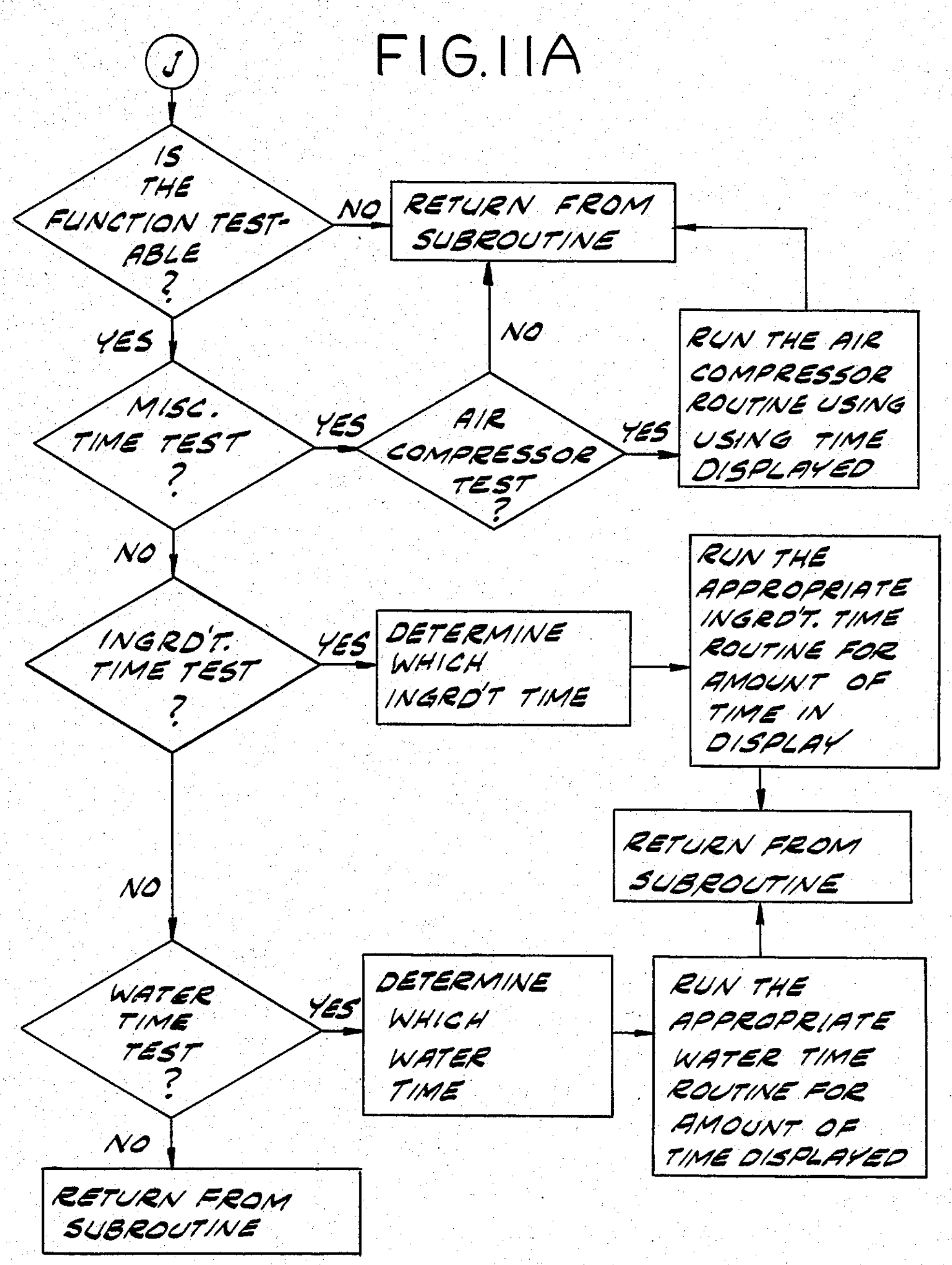

The TEST THROW subroutine (FIGS. 11 and 11A) has the same security portion as the above routines which means that FIG. 11 is the same as FIGS. 5–10 except that the access flag for test throws is ACFLG2-B3. The remainder of the flowchart (FIG. 11A) is different however. After determining that the TEST THROW function is unlocked, MPU 17 first checks to see if the requested throw is testable (FIG. 11A). If not it returns from the TEST THROW subroutine. If it is a testable function, MPU 17 examines it to see if it is a Miscellaneous Time test. In this embodiment the only miscellaneous time function which is testable is the air compressor. If the miscellaneous time function is the air compressor test, this test is run, and if not MPU 17 returns from the TEST THROW subroutine.

On the other hand, if the testable function is not a miscellaneous time test, MPU 17 determines if it is an ingredient test and, if it is, runs it with the value of the throw then in the display and returns from the subroutine. If not a miscellaneous time test or an ingredient throw test, MPU 17 checks if the test is a water quantity or water time test. If it is, it runs the test and returns from the subroutine. If it is not, a mistake has been made and MPU 17 returns from the subroutine immediately.

In the DIAGNOSTIC RUN subroutine (FIG. 12) MPU 17 first checks if an element from the diagnostic test list is being displayed in display 13. If not, it returns from the subroutine since the RUN selector has been actuated either by mistake or out of sequence. On the other hand, when a designation for a diagnostic test is being displayed when the RUN switch is actuated, MPU 17 identifies the selected diagnostic test, runs it, and then returns from the subroutine.

Figure 12:
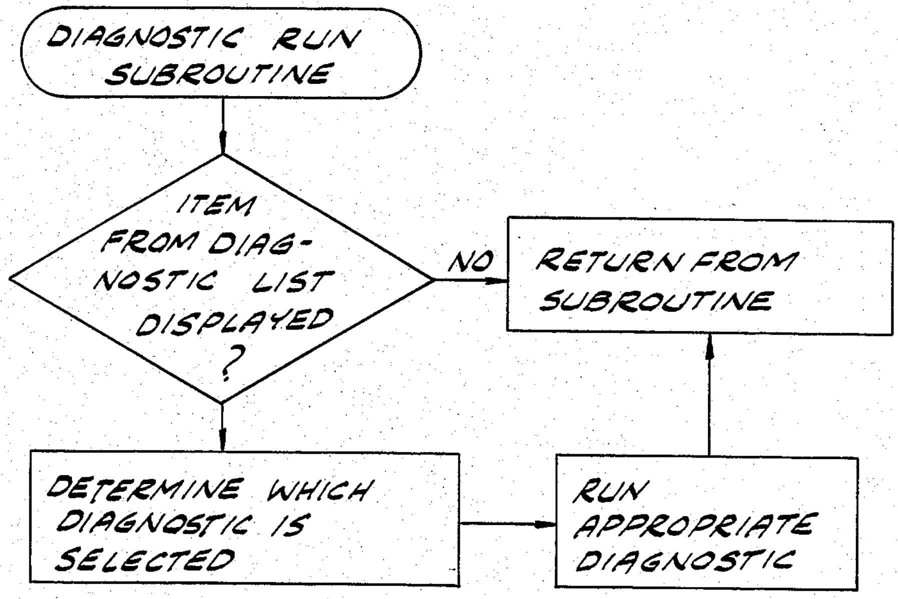
FIGS. 12 and 12A are the flow charts for the DIAGNOSTIC RUN and STAR subroutines of the program for the circuitry shown in FIGS. 3 and 3A–3F.
Figure 12A:
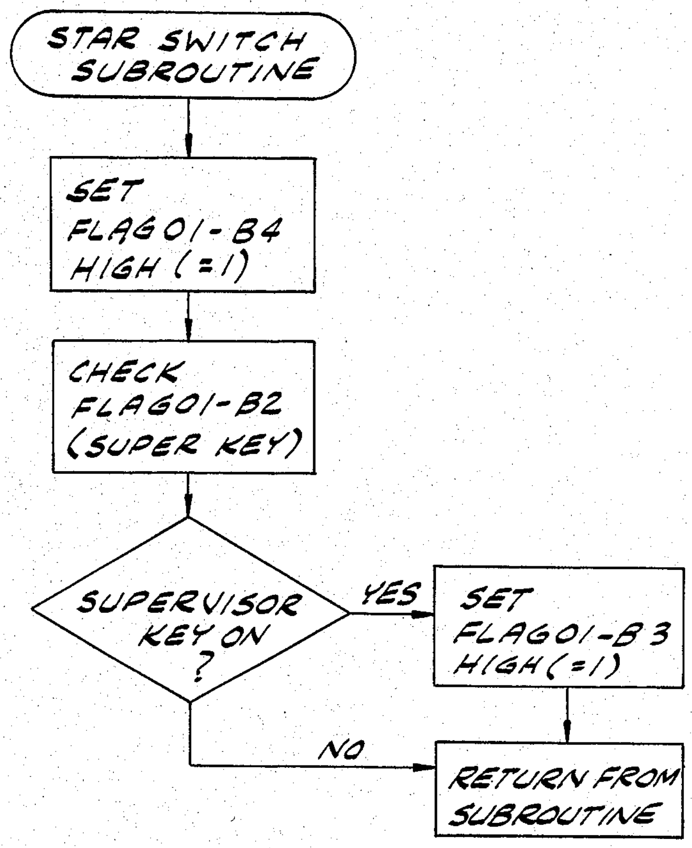
Figure 13:
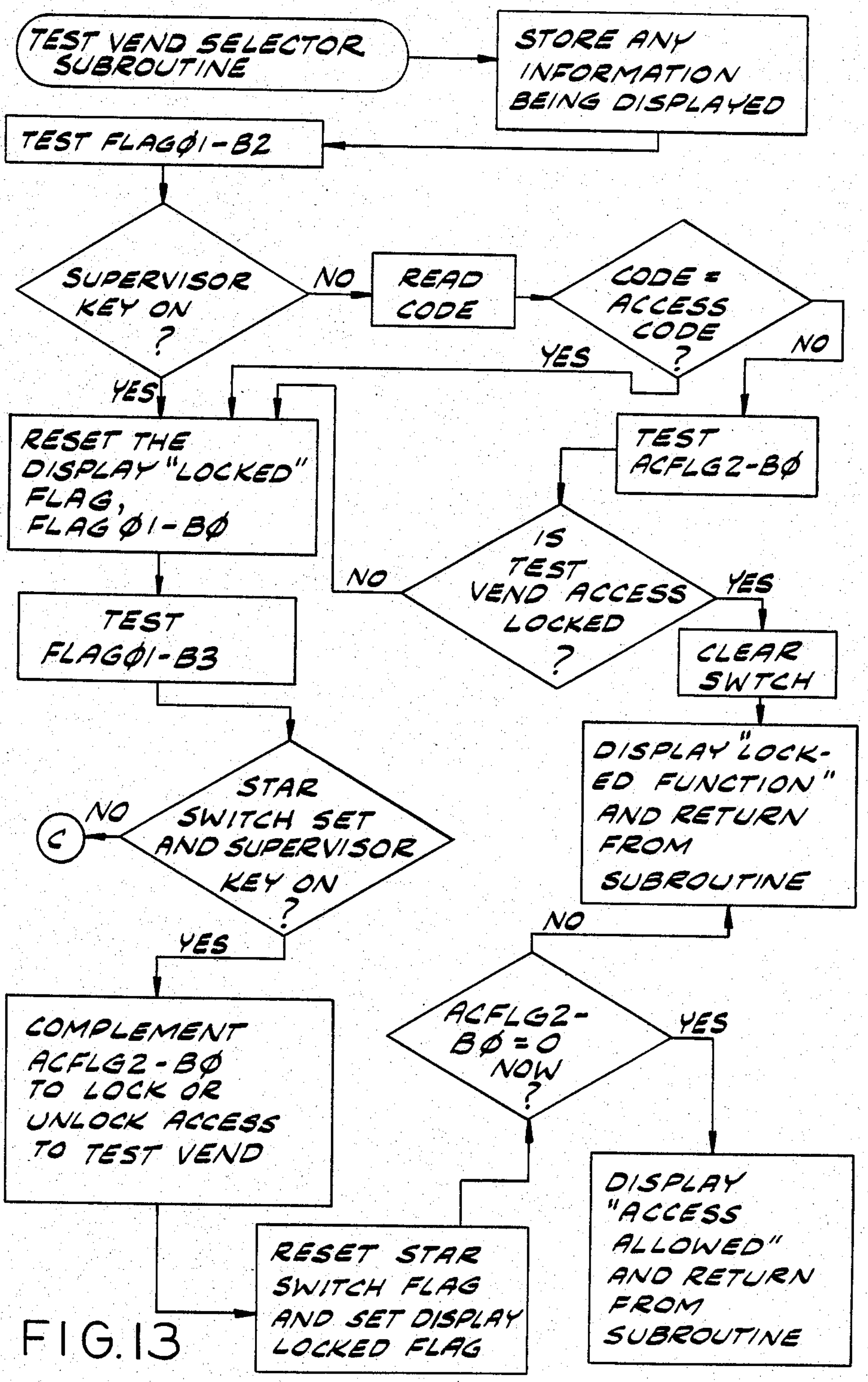

In the STAR switch subroutine (FIG. 12A), MPU 17 first sets a flag FLAG01-B4, then checks if the supervisor key is on. If it is FLAG01-B3, the lock-star flag, is set and MPU 17 returns from the subroutine. If the supervisor key is not on, FLAG01-B3 is not set before MPU 17 returns.

Figure 13A:
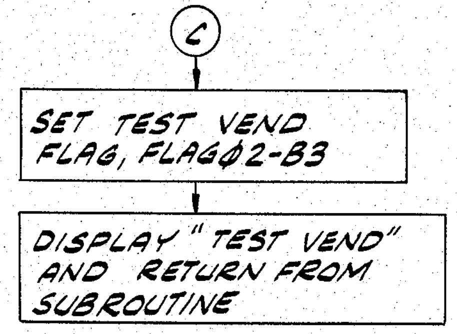
FIGS. 13 and 13A are the flow chart for the TEST VEND selector subroutine of the program for the circuitry shown in FIGS. 3 and 3A–3F.

The Test Vend subroutine (FIGS. 13 and 13A) has security provisions identical to those of, for example, the TIME-WATER subroutine. In this subroutine the access flag is ACFLG2-B0. Assuming access to the function is unlocked, or the supervisor key is present, or a valid access code is entered, the test vend routine (see FIG. 13A) sets a test vend flag FLAG02-B3, displays "TEST VEND" in display 13 and then returns from the subroutine. To perform a test vend, one presses the TEST VEND button, which sets the test vend flag, and then presses the selection switch for the selection which he wishes to test. In the vend routine (not shown), the presence of the test vend flag allows the vend to occur without the deposit of money in the vendor.

Figure 14:
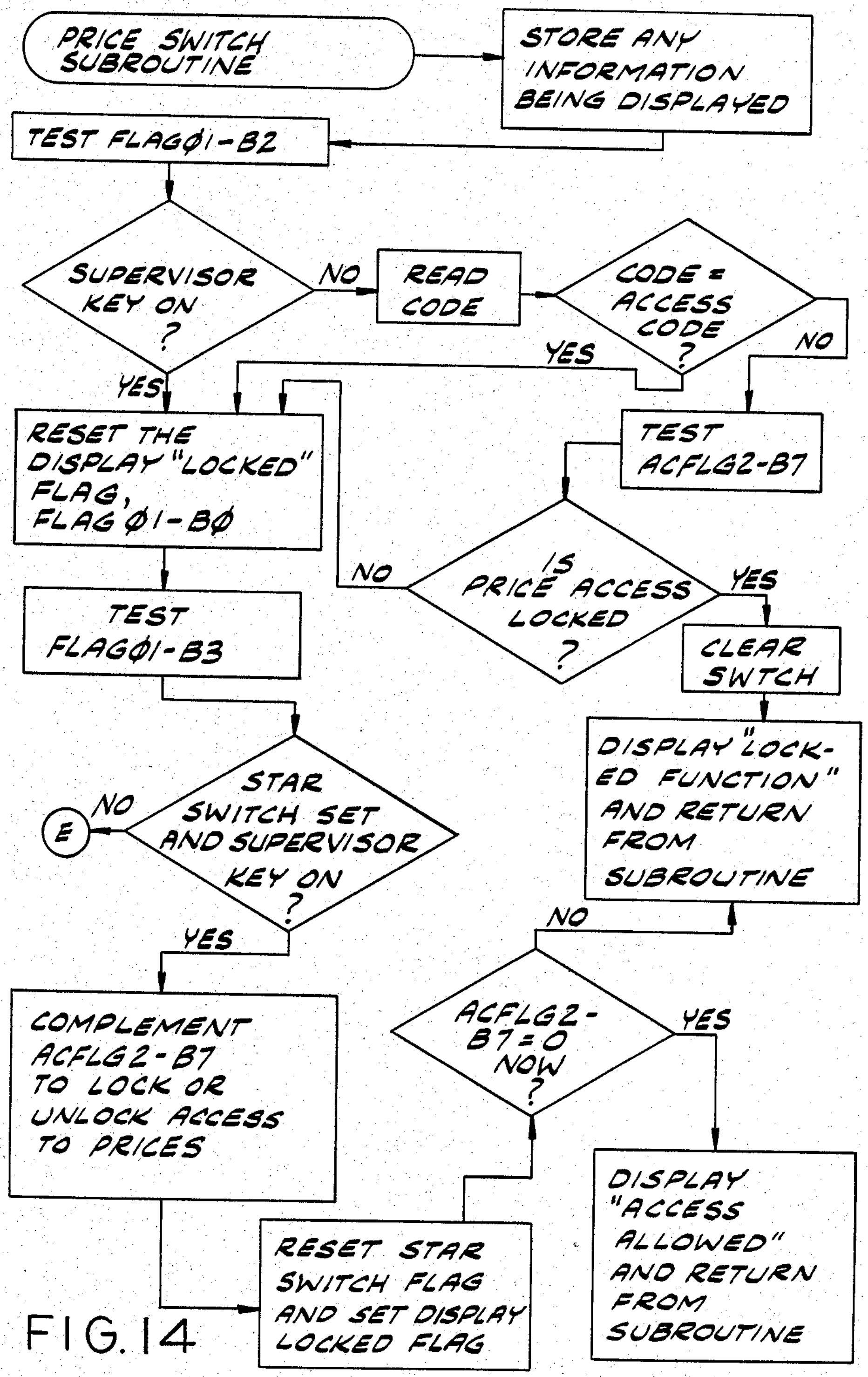
FIGS. 14, 14A and 14B are the flow chart for the PRICE switch subroutine of the program for the circuitry shown in FIGS. 3 and 3A–3F.
Figure 14A:
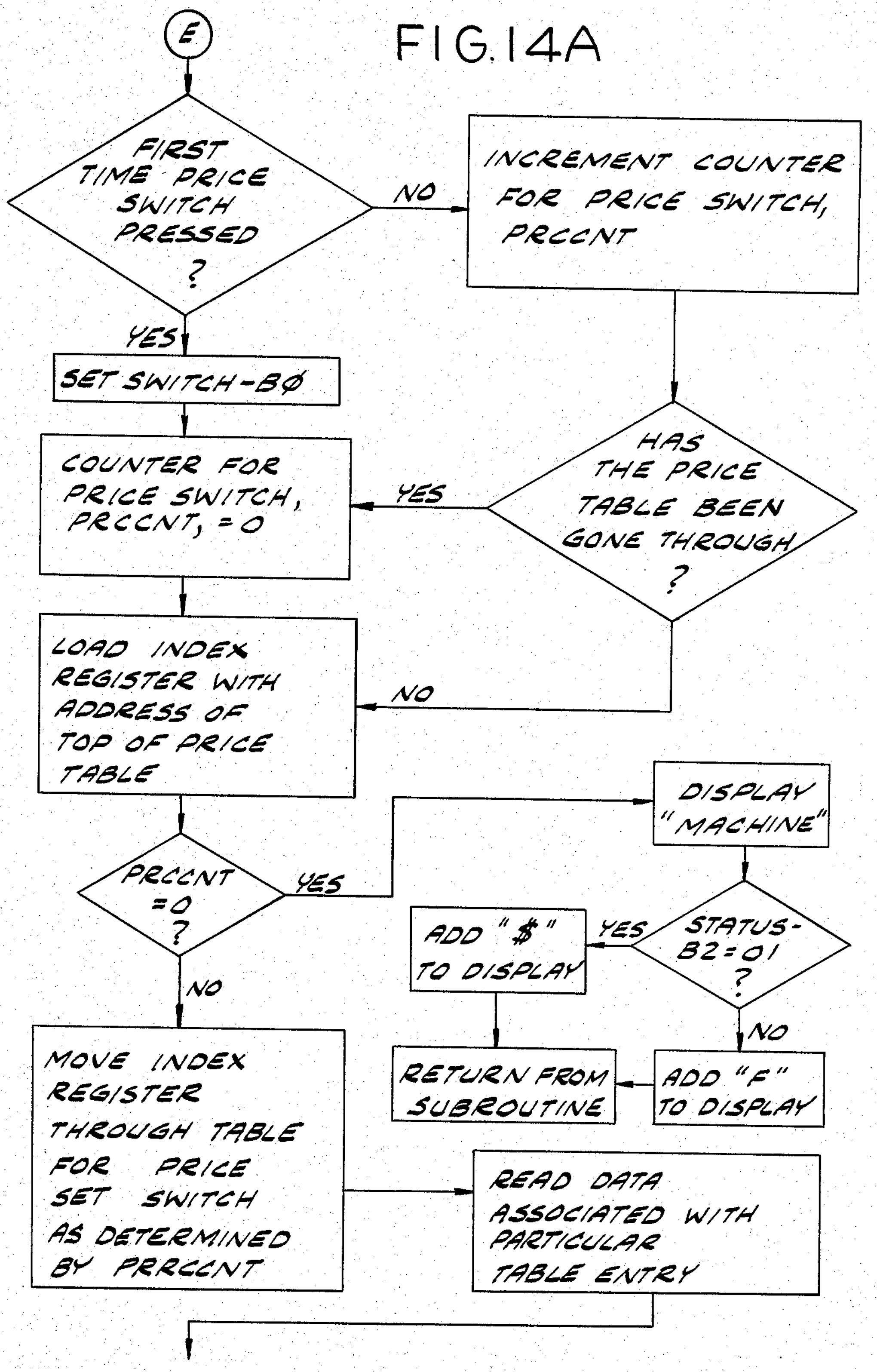
Figure 14B:
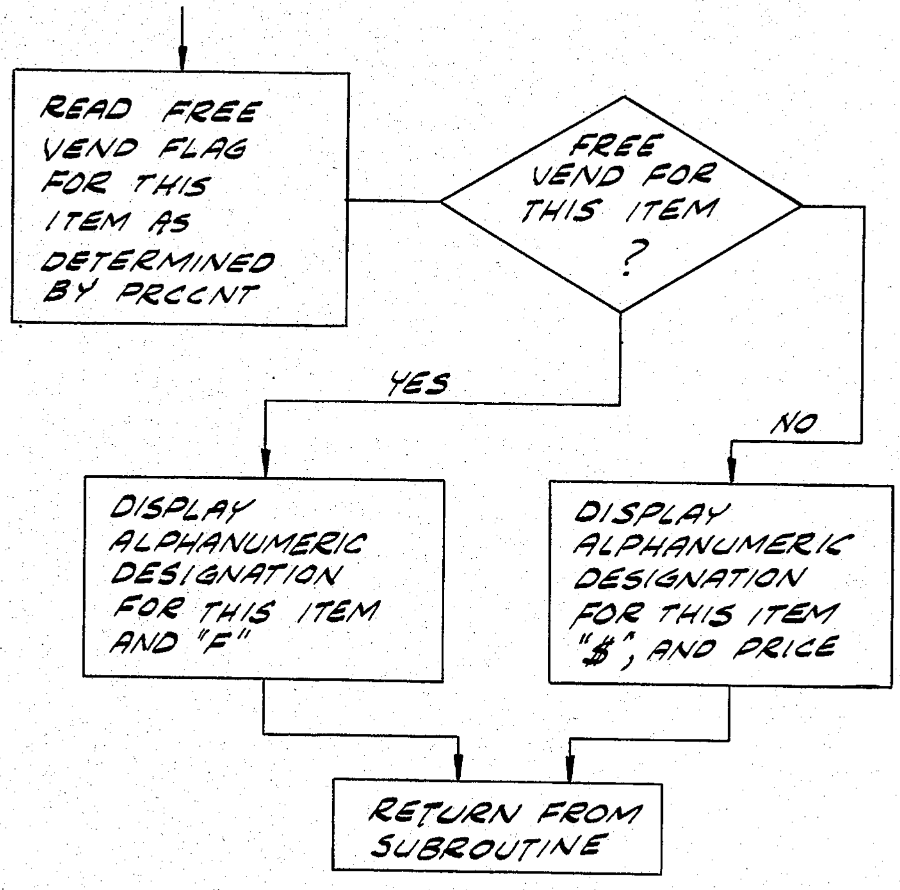
Figure 15:
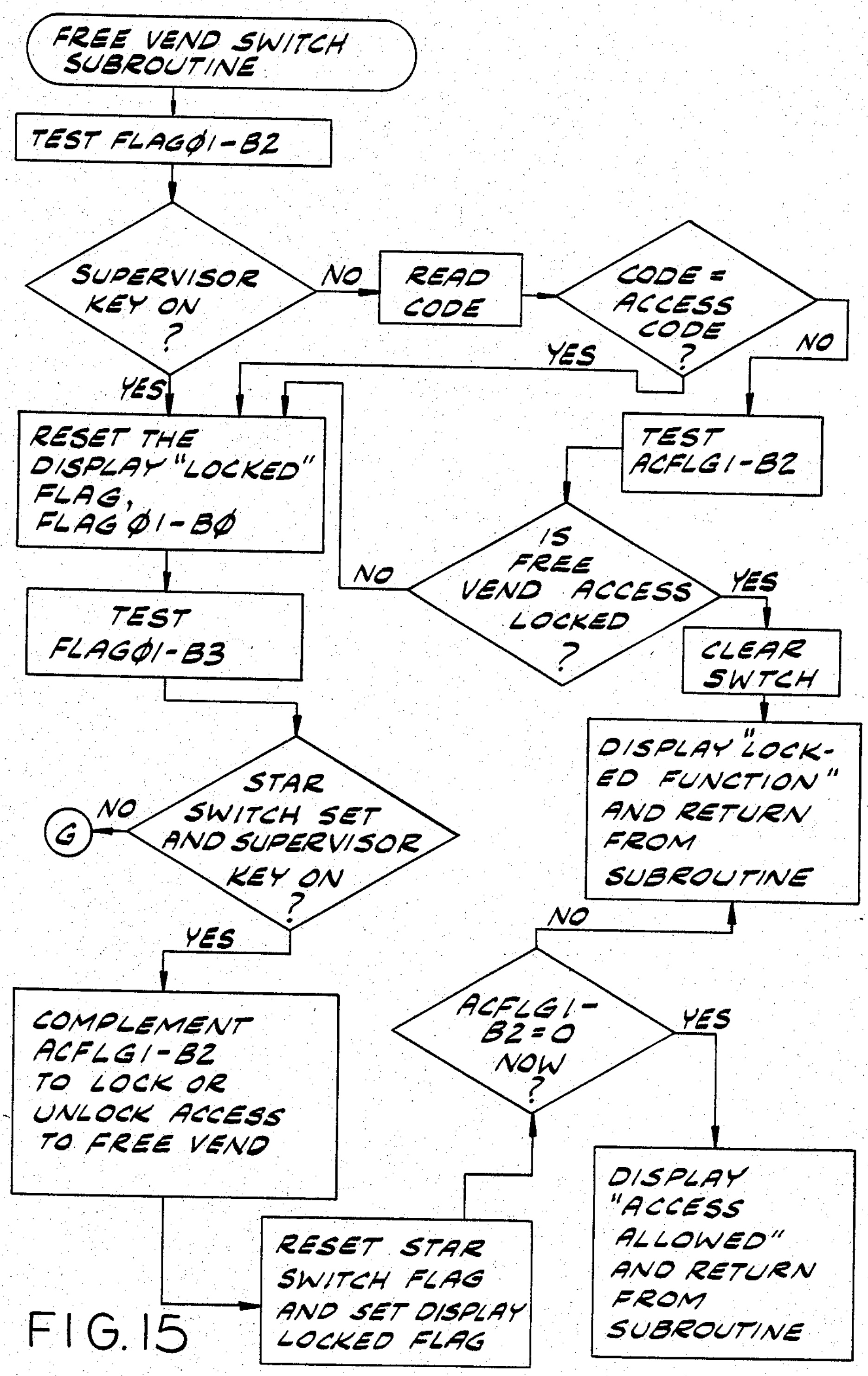
FIGS. 15, 15A, 15B and 15C are the flow chart for the FREE VEND switch subroutine of the program for the circuitry shown in FIGS. 3 and 3A–3F.
Figure 15A:
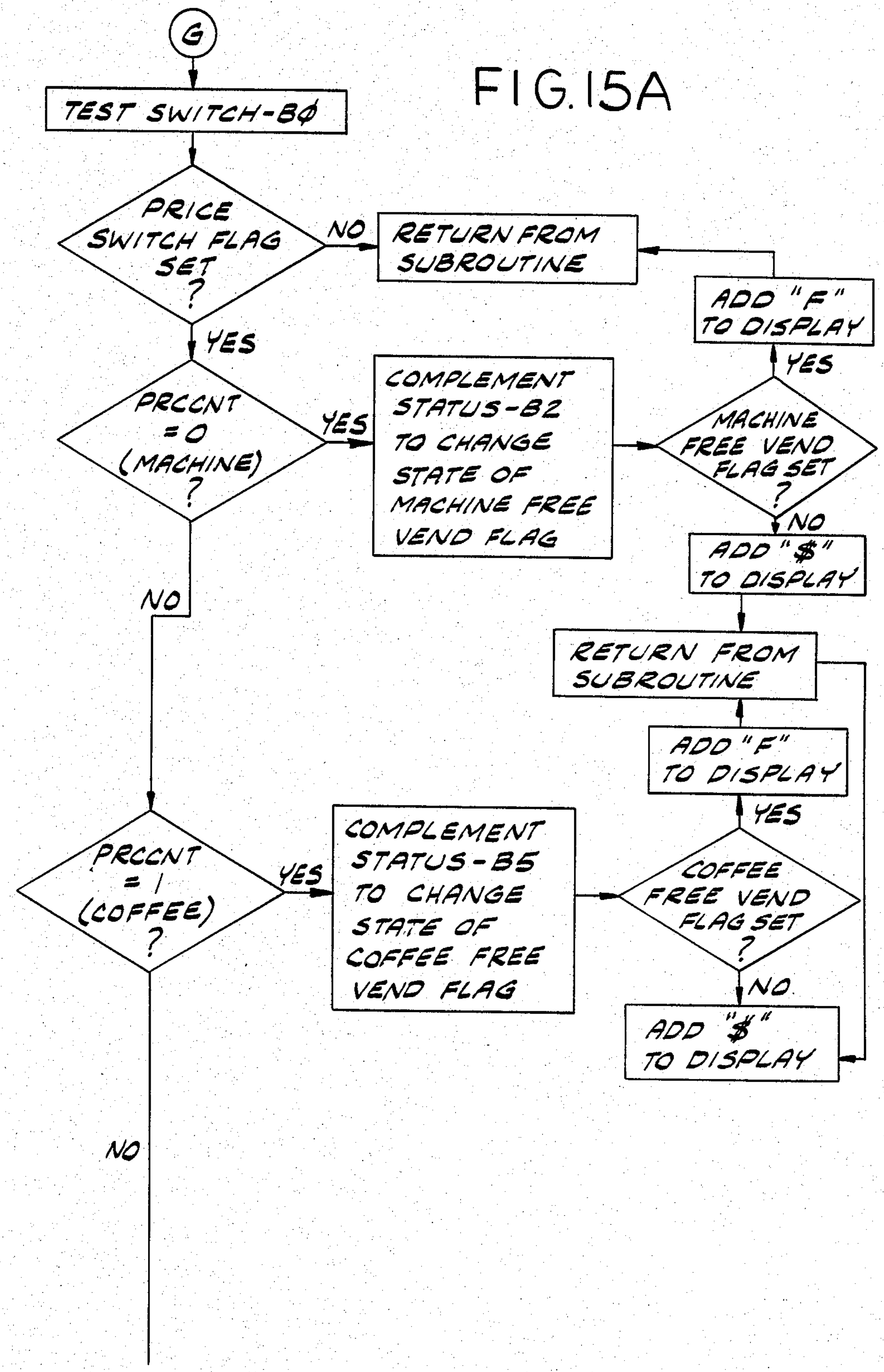
Figure 15B:
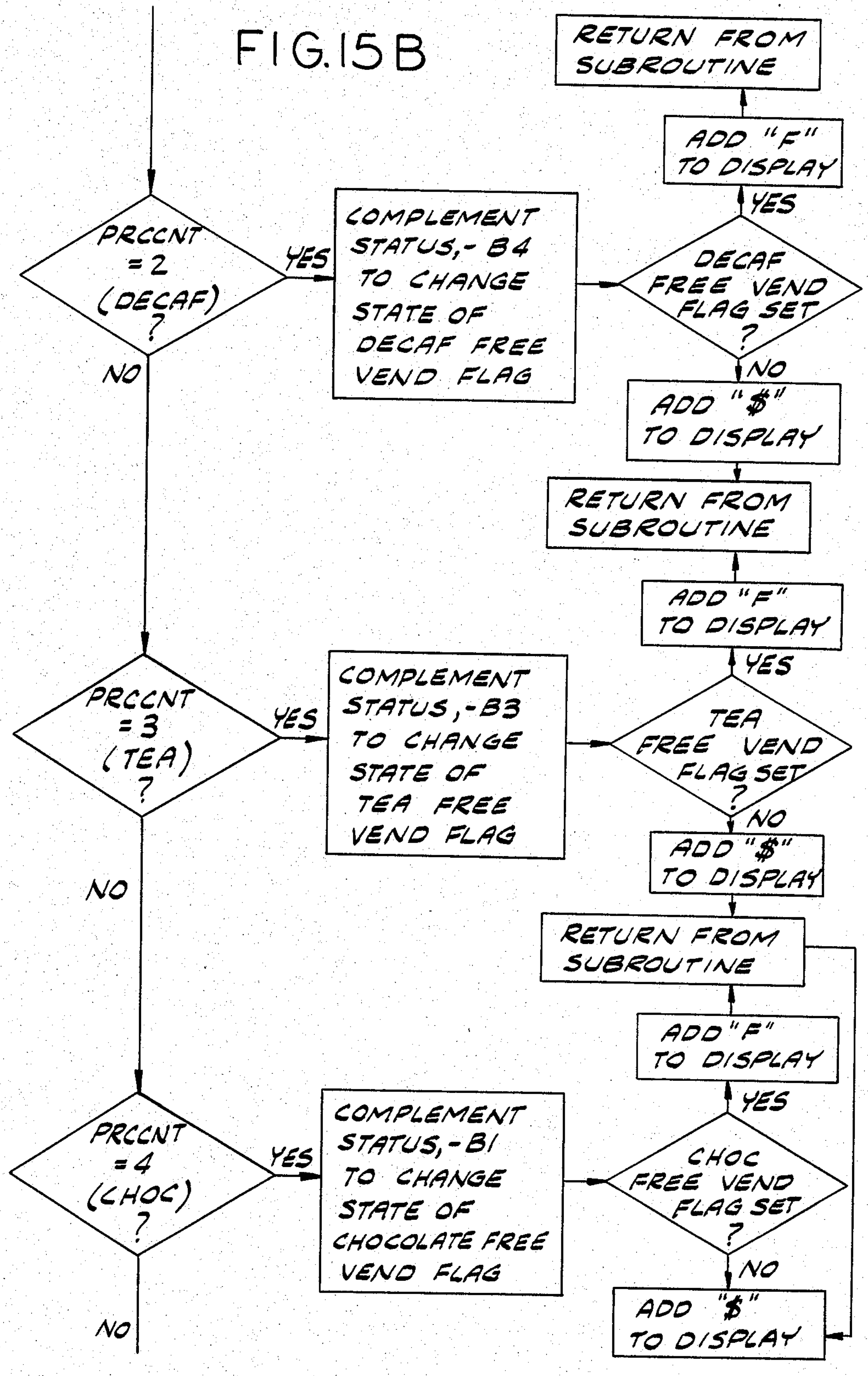
Figure 15C:
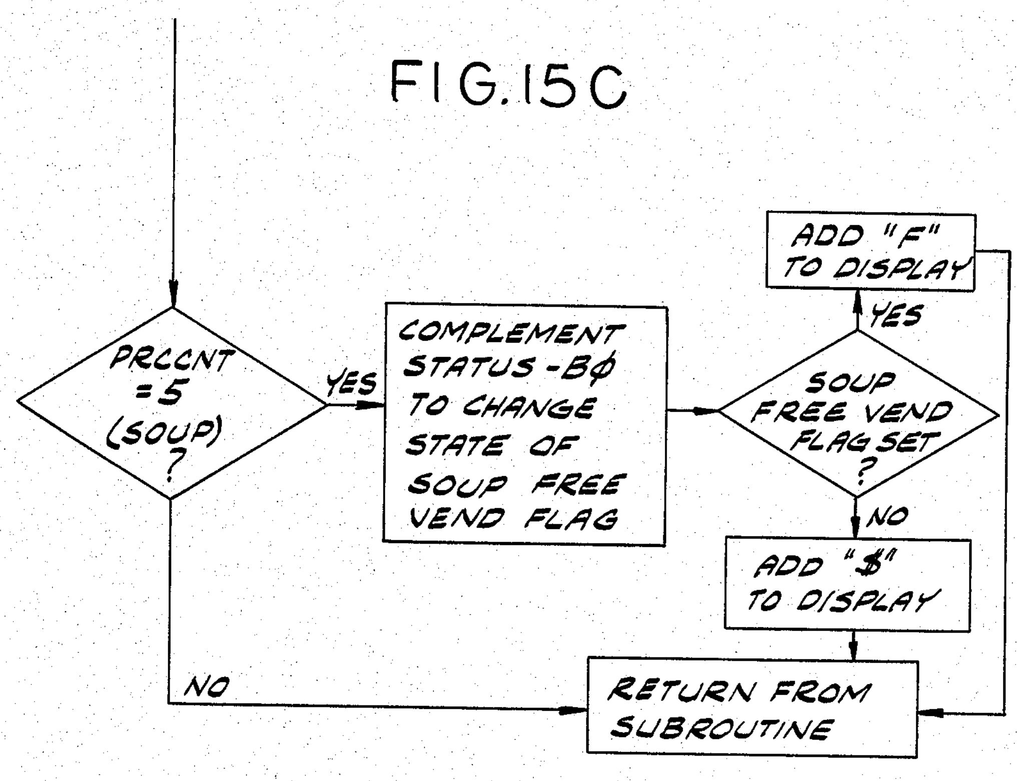
Figure 16:
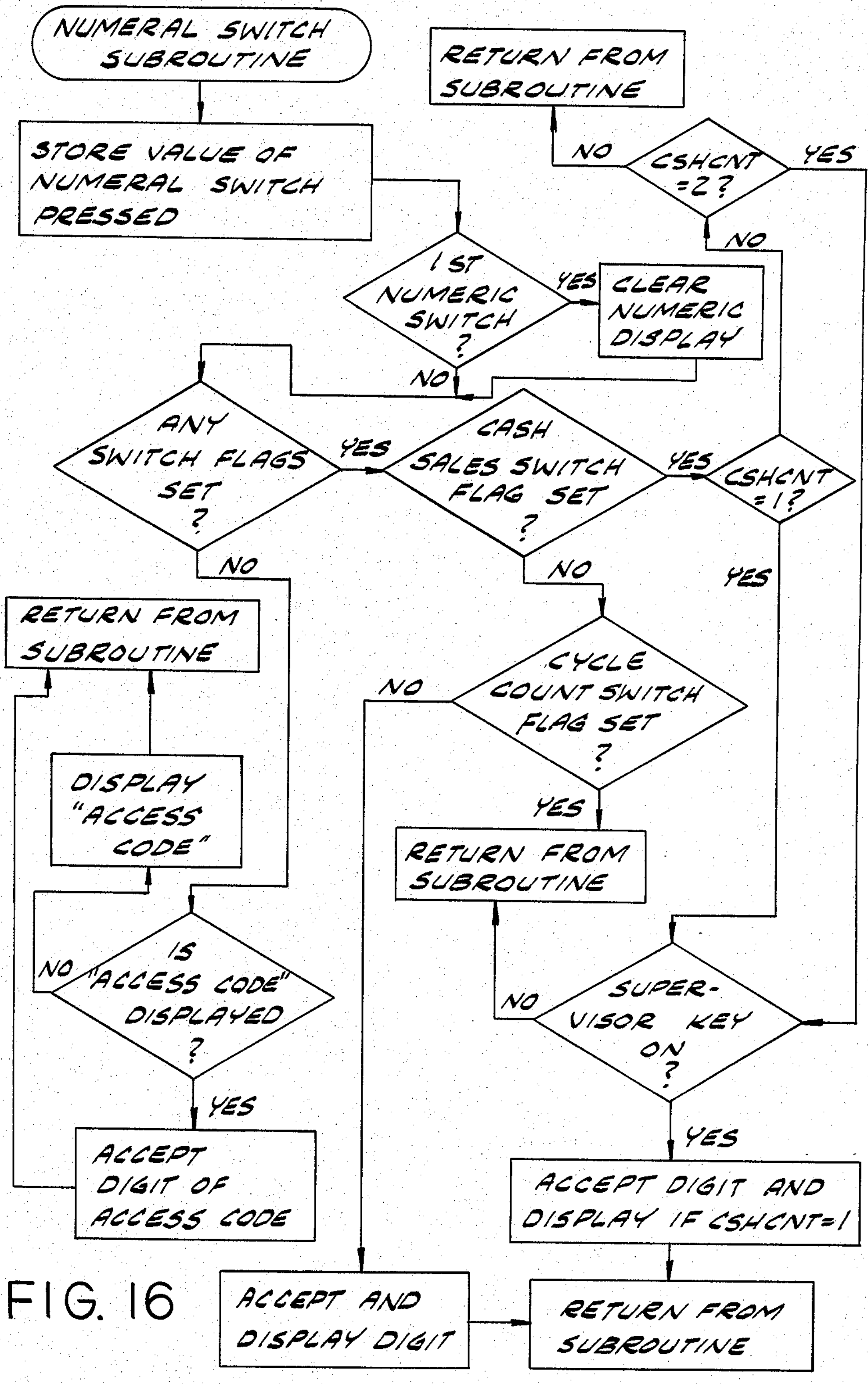
FIG. 16 is the flow chart for the numeral switch subroutine of the program for the circuitry shown in FIGS. 3 and 3A–3F.

The access flag for the PRICE SET switch is ACFLG2-B7. Assuming that this flag is zero, or the supervisor's key is on, or a valid access code is present, MPU 17 in the PRICE SET subroutine (FIGS. 14, 14A and 14B) branches to FIG. 14A. In this subroutine, however, the first actuation of the PRICE SET switch or the completion of the price set table causes the price counter, PRCCNT, to be set to zero instead of to one. If PRCCNT=0, MPU 17 causes the alphanumeric designation "MACHINE" to appear in the display. If the entire machine has been previously set to free vend, as recorded in a flag STATUS-B2, MPU 17 also causes a letter "F" to be displayed in the eleventh element from the left of the display, so that the display is

"MACHINE F".

On the other hand, if the machine is not on free vend, a "$" is displayed after "MACHINE". Likewise for PRCCNT not equal to zero, the designation of the corresponding element of the price table is displayed along with an "F", if selection is on free vend, or a "$", if that selection is not on free vend, along with the price set for that particular selection. For example, if the price of coffee is set at $0.35 but the coffee is set to free vend, the display will show

"COFFEE F .35"

while if coffee were not set to free vend the display would read

"COFFEE $ .35".

As mentioned above, the FREE VEND switch is used with the PRICE SET switch to set the machine or individual selections on free vend. The subroutine for this switch (FIGS. 15, 15A, 15B and 15C) includes security steps as outlined above. The access flag for this switch is ACFLG1-B2. Assuming functioning of the switch is allowed, which is determined by the flowchart of FIG. 15, MPU 17 then examines SWTCH-B0, the PRICE SET switch flag. If that flag is not set, no alphanumeric designation of a selection or the machine is being displayed, so a free vend command is out of order. MPU 17 returns from the subroutine. On the other hand, if the PRICE SET flag is set, MPU 17 checks the price counter, PRCCNT, to determine which designation is being displayed, complements the free vend flag corresponding to that value of PRCCNT to change the state of the flag, and then causes "F" or "$" as determined by the flag to be displayed. The values of PRCCNT, the corresponding status flags, and the corresponding designation are listed below.

| PRCCNT | STATUS FLAG | DESIGNATION |
|---|---|---|
| 0 | STATUS-B2 | MACHINE |
| 1 | STATUS-B5 | COFFEE |
| 2 | STATUS-B4 | DECAF |
| 3 | STATUS-B3 | TEA |
| 4 | STATUS-B1 | CHOC |
| 5 | STATUS-B0 | SOUP |

As an example, consider a vendor where coffee and tea are set on free vend while the machine and the rest of the selections are not. Pressing the PRICE SET switch twice causes

"COFFEE F .35"

to be displayed. Pressing the FREE VEND switch results in

"COFFEE $ .35"

being displayed, because the product was previously on free vend. Pressing the FREE VEND switch a second time puts coffee back on free vend and

"COFFEE F .35"

is again displayed. Any of the other selections or the whole machine can be set on free vend or removed from free vend in the same way.

The numeric switches are used to change throws, prices and times, to enter the machine ID and internal access code using a supervisor's key, and to enter an access code for comparison with the internal access code. The subroutine (FIG. 16) involves storing the value of the actuated numeric switch and then determining if this was the first closure of a numeric switch. If it was, the numeric part of the display is cleared. Then MPU 17 determines if any switch flags, such as the TIME WATER, TIME INGRD'T or PRICE SET flags are set. If a switch flag is set, MPU 17 checks if the CASH SALES switch flag is set. This switch is used to set the machine ID number and the internal access code. If the CASH SALES switch flag is set, that means the CASH SALES switch has been actuated and the person is either trying to enter a new machine ID number, enter a new internal access code, or change one of the cash sales totals. The first two possibilities correspond to the CASH SALES counter, CSHCNT, =1 or =2. If CSHCNT does not equal 1 or 2, the person is trying to change a cash total, which is not permitted. MPU 17 returns in that case from the subroutines. On the other hand, if CSHCNT does equal one or two, MPU 17 determines if the supervisor's key is on, and if it is, accepts a new digit of the machine ID number or internal access code respectively. If the supervisor's key is not on, MPU 17 returns from the subroutine because machine ID number and internal access code can only be changed by use of a supervisor's key.

If the switch flag set was not the flag for CASH SALES, MPU 17 checks if the CYCLE COUNT switch flag is set. If it is, it returns from the subroutine because the cycle counts may not be changed except to reset the resettable ones to zero. If it is not set, then one of the other switch flags was set. All the times, prices and throws corresponding to these other switches may be changed as desired, if not locked, so MPU 17 accepts and displays the digit in display 13. Entry of each new number causes the numbers in the display to shift one space to the left. For example, to change the price of coffee from 35¢ to 45¢, one actuates the PRICE SET switch twice to display

"COFFEE $ .35".

Pressing the numeric switch 4 causes the numeric portion of the display to be cleared and 04 to be displayed, i.e.,

"COFFEE $ .04"

is displayed. Then pressing the 5 switch causes the 4 to rotate to the left in the display and a 5 to appear at its right so that

"COFFEE $ .45"

is now displayed. Pressing one of the non-numeric keys such as PRICE SET or TIME INGRD'T causes this new price to be entered into memory for coffee.

Assume no switch flags are set when a numeric switch is actuated. This occurs when a switch whose data or functions is locked is pressed and the message "FUNCTION LOCKED" appears in the display or immediately after the vendor cabinet door is opened and no switches have yet been pressed. The user then, if he knows the access code, can enter it by pressing any numeric key, which causes the words "ACCESS CODE" to be displayed, and then entering his code one digit at a time. MPU 17 accepts it for comparison with its internal access code. Note that the access code is not displayed, which prevents unauthorized persons from learning the access code simply by viewing display 13 while the access code is being entered.

As a further example of this invention, assume that a supervisor with a key wants to lock access to the water quantity data, to the price data and to the cash sales data, to put coffee on free vend and to enter an internal access code. To lock access to the water quantity data, he must close switch SW1 by turning key 15 in the lock. He locks access to the water quantity data by pressing the STAR switch and then pressing the TIME-WATER switch. Assuming access was previously unlocked, "FUNCTION LOCKED" will now appear in display 13. Pressing the STAR switch and the PRICE SET switch locks the price data, and pressing the STAR switch a third time, followed by the CASH SALES switch locks access to cash sales data. To put coffee on free vend, the supervisor presses the PRICE SET switch twice, to cause

"COFFEE $ 0.35"

to be displayed and then presses the FREE VEND switch. To enter the internal access code, the supervisor presses the CASH SALES switch twice causing "ACCESS CODE" to be displayed. He then uses the numeric key to enter an internal access code of up to eight digits.

A route man, without a supervisor's key or knowledge of the access code can now check and change ingredient throws, for example, by repeatedly actuating the TIME INGRED'T selector and entering new values of the throws as desired with the numeric keys. He cannot, however, check or change water quantities, prices or view cash sales data because that data is locked. Pressing any one of those selectors will result in "FUNCTION LOCKED" being displayed on display 13.

If the supervisor, or anyone else who knows the access code, wants access to water quantities, prices or cash sales data they can get temporary access thereto by using the numeric keys to enter the access code. But without the supervisor's key they cannot change the permanent locked status of that data. Once the vendor door is closed and reopened the access code must be reentered or the supervisor's key used to gain access to locked data.

From the above it can be seen that memory 19 constitutes a memory for electronically storing information associated with the vending of items, including numeric information such as sales data, price data, and throws, and non-numeric information such as lists of diagnostic tests. The information stored in memory 19 is divided into a number of categories such as price, sales data, water quantities and ingredient throws each of which has a manually operable selector corresponding thereto. The categories of information are divided into units such as coffee price, sugar throw and total sales. MPU 17 constitues means responsive to actuation of one of the selectors for retrieving from memory 19 one unit of vending information, such as the price of coffee or the designation of a particular diagnostic test, from the category corresponding to the actuated selector for each actuation of that selector and for signaling alphanumeric displays 31, 33 to display a multi-character alphanumeric designation identifying the particular information unit retrieved and a number, if any, representing the numeric value of that information unit, MPU 17 being responsive to repeated actuations of the corresponding selector to retrieve and display the designations and numeric values, if any, for all units of a given category. Numeric switches 0–9 constitute means for entering prices, throws, quantities or times into controller 11 for storage in the memory.

Furthermore, key-operated switch SW1 and the lock constitute means for authenticating data security key 15 and the STAR switch constitutes a manually operable locking-mode selector. MPU 17 is responsive to switch SW1 and to actuation of the STAR switch to go into an access locking mode when switch SW1 is closed, which authenticates the key, in which mode it is responsive to operation of a manually operable selector, such as the PRICE SET switch, for locking access to the corresponding category of information if access thereto was previously unlocked. Together MPU 17 and the STAR switch constitute mode control means for setting controller 11 in an access locking mode when data security key 15 is authenticated. Access to a category of information which has been locked remains locked after key 15, the data security key, is removed. Numeric keys 0–9 also consitute means for supplying a data access code signal to MPU 17, it being responsive to receipt of a data access code signal to allow, retrieval of information as to which access is locked without permanently changing the locked status of that information.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. For a vendor for vending a plurality of items, a controller comprising:

- a memory for electronically storing numeric information associated with the vending of items, said information being divided into a number of categories which are subdivided into units;
- a set of manually operable selectors, one selector for each category of information;
- an alphanumeric display; and
- logic means interconnected with said memory, said manually operable selectors and said alphanumeric display and responsive to actuation of the selectors for retrieving from the memory one unit of vending information from the category corresponding to the actuated selector for each actuation of the selector and supplying said one unit of vending information to the alphanumeric display to display a multi-character alphanumeric designation identifying the particular information unit retrieved and a number representing the numeric value of that information unit, said logic means being responsive to repeated actuations of the corresponding selector to retrieve from said memory and display on said alphanumeric display the designations and numeric values for all units of a given category.

2. A controller as set forth in claim 1 wherein one category of vending information is price, the units of information in that category being the prices for the individual items, and wherein one of the manually operable selectors is a price selector, said logic means being responsive to repeated actuations of the price selector consecutively to display price information and alphanumeric designations for each item to be vended.

3. A controller as set forth in claim 2 further including means for entering prices of the items for storage in the memory, said logic means being responsive to the entry of a price for an item to store said price in the memory.

4. A controller as set forth in claim 1 wherein each item to be vended comprises a quantity of water, said memory having stored therein information as to water quantity, said manually operable selectors including a water quantity information selector for selecting water quantity information to be retrieved from the memory for display.

5. A controller as set forth in claim 4 further including means for entering water quantity information for the items for storage in memory, said logic means being responsive to the entry of water quantity information for an item to store said water quantity information in the memory.

6. A controller as set forth in claim 1 wherein each item to be vended comprises a throw of an ingredient, said memory having stored therein ingredient throw information for said items, said manually operable selectors including an ingredient throw information selector for selecting ingredient throw information to be retrieved from the memory for display.

7. A controller as set forth in claim 6 further including means for entering ingredient throw information for the items for storage in the memory, said logic means being responsive to the entry of ingredient throw information for an item to store said ingredient throw information in the memory.

8. A controller as set forth in claim 1 wherein said memory has sales information associated with the vending of items stored therein, said manually operable selectors including a sales information selector for selecting sales information to be retrieved from the memory for display.

9. A controller as set forth in claim 9 further in claim 1 further including means for authenticating a data security key and a manually operable locking-mode selector, said logic means being responsive to the authenticating means and to actuation of the locking-mode selector to set the controller in an access locking mode when a data security key is authenticated and responsive to operation of one of the manually operable selectors while the controller is in the access locking mode for locking access during normal operation of the controller to the category of information corresponding to the actuated selector if access to said category was previously unlocked, access during normal operation of the controller to a category of information which has been locked remaining locked after the data security key is removed and access to other categories not locked during the access locking mode remaining unlocked and accessible during normal operation of the controller.

10. A controller as set forth including manually operable means for supplying a data access code signal to the logic means, said logic means being responsive to receipt of the data access code signal during normal operation of the controller to allow retrieval of information as to which access is locked without permanently changing the locked status of that information.

11. For a vendor for vending a plurality of items, a controller settable in either a normal operating mode or an access locking mode, comprising:

a memory for electronically storing a number of categories of information associated with the vending of items;

a set of manually operable selectors interconnected with said memory for selecting categories of information to be retrieved from the memory, one selector for each category; and means associated with said memory for locking access during normal operation of the controller to the categories of information, said locking means including means for authenticating a data security key and mode control means responsive to the authenticating means for setting the controller in the access locking mode when a data security key is authenticated and said controller being responsive to operation of one of the manually operable selectors while the controller is in the access locking mode for locking access during normal operation of the controller to the category of information corresponding to the actuated selector if access to said category was previously unlocked, access to categories of information which have been locked remaining locked after the data security key is removed and access to categories not locked during the access locking mode remaining unlocked and accessible during normal operation of the controller.

12. A controller as set forth in claim 11 wherein the mode control means includes a manually operable locking-mode selector and logic means responsive to actuation of the locking mode selector for setting the controller in the access locking mode.

13. A controller as set forth in claim 11 further including manually operable means for supplying a data access code signal to the locking means, said locking means being responsive to receipt of the data access code signal to allow retrieval of information as to which access is locked without permanently changing the locked status of that information, whereby a person knowing the data access code may retrieve locked information from the controller without a data security key.

14. A controller as set forth in claim 11 further including a multi-character display and wherein the locking means includes logic means responsive to operation of one of said selectors corresponding to a category of information as to which access is unlocked for retrieving information from said category from the memory and sending it to the multi-character display for display.

15. A controller as set forth in claim 11 wherein the categories of vending information include prices for the items to be vended, the controller further including means for entering prices of the items for storage in the memory.

16. A controller as set forth in claim 15 further including multi-character display, wherein the manually operable selectors include a price selector, and wherein the locking means includes logic means responsive to operation of the price selector to retrieve price information from the memory if access thereto is unlocked and to send it to the multi-character display for display.

17. A controller as set forth in claim 11 wherein each item to be vended comprises a quantity of water, said memory having stored therein information as to water quantity, said manually operable selectors including a water quantity information from the memory if access there to is unlocked and to send it to the multi-character display for display.

18. A controller as set forth in claim 17 further including a multi-character display and wherein the locking means includes logic means responsive to operation of the water quantity information selector to retrieve water quantity information from the memory if access thereto is unlocked and to send it to the multi-character display for display.

19. A controller as set forth in claim 17 further including means for entering water quantity information for storage in the memory.

20. A controller as set forth in claim 11 wherein each item to be vended comprises a throw of an ingredient, said memory has stored therein ingredient throw information, said manually operable selectors including an ingredient throw information selector for selecting ingredient throw information to be retrieved from memory.

21. A controller as set forth in claim 20 further including a multi-character display and wherein the locking means includes logic means responsive to operation of the ingredient throw information selector to retrieve ingredient throw information from the memory if access thereto is unlocked and to send it to the multi-character display for display.

22. A controller as set forth in claim 20 further including means for entering ingredient throw information for storage in the memory.

23. A controller as set forth in claim 11 wherein the vending information includes sales information, said manually operable selectors including a sales information selector, whereby access to sales information may be locked, thereby preventing persons not authorized to observe sales data from observing said sales data.

24. A controller as set forth in claim 11 wherein the locking means includes a key-operated switch.

25. For a vendor for vending a plurality of items, a controller comprising:

a memory for electronically storing information associated with the vending of items;

a set of manually operable selectors;

an alphanumeric display; and logic means interconnected with said memory, said manually operable selectors and said alphanumeric display and responsive to actuation of any one of the selectors for signaling said memory to supply the alphanumeric display with information to display a multi-character alphanumeric designation associated with the actuated selector, at least some of said selectors having more than one multi-character alphanumeric designation associated therewith, said logic means being responsive to repeated actuations of said selectors to signal the alphanumeric display to display all the designations corresponding to the repeatedly actuated selector.

26. A controller as set forth in claim 25 wherein one of the manually operable selectors is a diagnostic selector having associated therewith a plurality of designations representing diagnostic tests to be performed on the vendor, said logic means being responsive to repeated actuations of the diagnostic selector to signal said memory to supply the alphanumeric display with information to display all the designations representing diagnostic tests to be performed on the vendor.

27. A controller as set forth in claim 26 further including manually operable means for initiating a diagnostic test, said logic means being responsive to said initiating means to run the diagnostic test corresponding to the designation being displayed on the alphanumeric display.

28. A controller as set forth in claim 27 wherein the normally operable means for initiating a diagnostic test constitutes item selector switches, said logic means being responsive to the closure of an item selector switch to retrieve from memory and supply to said display an alphanumeric designation representing the item associated with the closed item selection switch.

* * * * *

UNITED STATES PATENT AND TRADEMARK OFFICE

CERTIFICATE OF CORRECTION

PATENT NO. : 4,523,285

DATED : June 11, 1985

INVENTOR(S) : William W. Hendrickson and Theodore B. Boerding

It is certified that error appears in the above—identified patent and that said Letters Patent is hereby corrected as shown below:

Column 15, line 15, "as set forth in claim 9 further as set forth in claim 1 further" should read -- as set forth in claim 1 further --. Column 16, lines 42-44, "information from the memory if access there to is unlocked and to send it to the multi-character display for display" should read -- information selector for selecting water quantity information to be retrieved from memory. --.

Signed and Sealed this

*Thirty-first* Day of *December 1985*

[SEAL]

*Attest:*

DONALD J. QUIGG

*Attesting Officer* *Commissioner of Patents and Trademarks*